(12) United States Patent
Kirch

(10) Patent No.: US 11,274,662 B2
(45) Date of Patent: Mar. 15, 2022

(54) INTAKE-ADAPTABLE GAS GENERATOR

(71) Applicant: DropTech, LLC, Gainesville, TX (US)

(72) Inventor: Paul Kirch, San Antonio, TX (US)

(73) Assignee: DROPTECH, LLC, Gainesville, TX (US)

( * ) Notice: Subject to any disclaimer, the term of this patent is extended or adjusted under 35 U.S.C. 154(b) by 0 days.

(21) Appl. No.: 17/360,097

(22) Filed: Jun. 28, 2021

(65) Prior Publication Data

US 2021/0404449 A1    Dec. 30, 2021

Related U.S. Application Data

(60) Provisional application No. 63/044,880, filed on Jun. 26, 2020.

(51) Int. Cl.
*F03G 7/00* (2006.01)
*F02C 1/02* (2006.01)
(Continued)

(52) U.S. Cl.
CPC .............. *F03G 7/0252* (2021.08); *F02C 1/02* (2013.01); *F02C 6/14* (2013.01); *F02C 9/16* (2013.01);
(Continued)

(58) Field of Classification Search
CPC ..................... F03G 7/025–04; F02C 1/02–105
See application file for complete search history.

(56) References Cited

U.S. PATENT DOCUMENTS

| 4,110,628 A | * | 8/1978 | Paull | E21B 43/34 290/1 R |
| 4,920,749 A | * | 5/1990 | Letarte | F01K 25/14 60/648 |

(Continued)

FOREIGN PATENT DOCUMENTS

| CN | 103883400 A | 6/2014 |
| CN | 111322040 A | 6/2020 |

(Continued)

OTHER PUBLICATIONS

International Search Report and Written Opinion of the International Searching Authority as issued in International Patent Application No. PCT/US2021/039335, dated Oct. 21, 2021.

*Primary Examiner* — Laert Dounis
(74) *Attorney, Agent, or Firm* — Pillsbury Winthrop Shaw Pittman LLP

(57) ABSTRACT

A system includes a generator using a fluid mixture obtained via a generator inlet, a compressor having a compressor inlet that is connected to a generator outlet by a first set of conduits, a second set of conduits connected to the compressor outlet and the generator inlet, and a sensor in communication with the second set of conduits, where a portion of the fluid mixture includes gas from a hydrocarbon well, and where exhaust fluid of the generator is provided to the compressor. A process includes obtaining a target fluid property and a fluid measurement using the sensor and modifying a parameter of a fluid control device to modify a first flow rate of the flow of the exhaust fluid through the second set of conduits relative to a second flow rate of the flow of the gas provided by the hydrocarbon well through the first set of conduits.

20 Claims, 7 Drawing Sheets

(51) Int. Cl.
*F02C 6/14* (2006.01)
*F17D 1/02* (2006.01)
*F02C 9/16* (2006.01)
*H02P 9/02* (2006.01)

(52) U.S. Cl.
CPC ............... *F03G 7/027* (2021.08); *F17D 1/02* (2013.01); *H02P 9/02* (2013.01)

(56) References Cited

U.S. PATENT DOCUMENTS

| | | | |
|---|---|---|---|
| 5,685,155 A * | 11/1997 | Brown | F02C 6/14 60/698 |
| 2006/0054318 A1 | 3/2006 | Sarada | |
| 2008/0283249 A1 | 11/2008 | Zubrin et al. | |
| 2015/0344770 A1 | 12/2015 | Lewis | |
| 2017/0292350 A1 * | 10/2017 | Weflen | F02C 1/02 |

FOREIGN PATENT DOCUMENTS

| | | | | |
|---|---|---|---|---|
| WO | WO-2014015307 A1 * | 1/2014 | ............... | F02C 1/05 |
| WO | 2018/194650 A1 | 10/2018 | | |

\* cited by examiner

INTAKE-ADAPTABLE GAS GENERATOR

CROSS-REFERENCE TO RELATED APPLICATIONS

This patent claims priority to provisional application 63/044,880 filed Jun. 26, 2020, titled "INTAKE-ADAPTABLE GAS-POWERED GENERATOR." The entire content of the aforementioned patent filing is hereby incorporated by reference for all purposes.

BACKGROUND

Hydrocarbon extraction from hydrocarbon wells often results in the production of volatile, combustible gases. In many cases, these gases are infeasible to transport or otherwise process due to the low volume or the lack of homogeneity in the gas mixture itself. Various extraction sites may include flaring systems designed to burn these gases in order to prevent them from escaping into the atmosphere.

SUMMARY

The following is a non-exhaustive listing of some aspects of the present techniques. These and other aspects are described in the following disclosure.

Some embodiments may use a system including sensors, valves, pipes, compressors, and other fluid-measuring or fluid-handling equipment to power a gas generator using gas produced from a hydrocarbon well or obtained from outgassing phenomenon. Some embodiments may inject the gas into a set of tanks that provide a positive pressure atmosphere that will divert gas from a vapor destruction system into a compression system when a set of gas criteria is satisfied. Some embodiments may further use the produced gas or gas combustion byproducts for reinjection into a well site or dry ice production.

Some aspects include a system includes a gas generator to generate electrical energy using a fluid mixture obtained via a generator inlet of the gas generator, wherein a portion of the fluid mixture comprises gas provided by a hydrocarbon well. The system may include a compressor, wherein a compressor inlet of the compressor is attached to a generator outlet of the gas generator by a first set of conduits, and wherein exhaust fluid of the gas generator is provided to the compressor via the first set of conduits. The system may include a second set of conduits connected to a compressor outlet of the compressor and the generator inlet. The system may include a sensor in communication with the second set of conduits, wherein the sensor measures fluid properties of fluids flowing through a portion of the second set of conduits.

Some aspects include a process, the process including obtaining, with a computer system, a target fluid property of a fluid mixture entering a generator inlet. The process may include obtaining a fluid measurement of the fluid mixture using a sensor. The process may include determining whether the fluid measurement satisfies a criterion based on the target fluid property. The process may include, in response to a determination that the target fluid property satisfies the criterion, modifying an operational parameter of a set of fluid control devices to increase a first flow rate relative to a second flow rate, wherein the first flow rate is a measurement of the flow of exhaust fluid through a first set of conduits, and wherein the second flow rate is a measurement of the flow of the gas provided by a hydrocarbon well through a first set of conduits.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
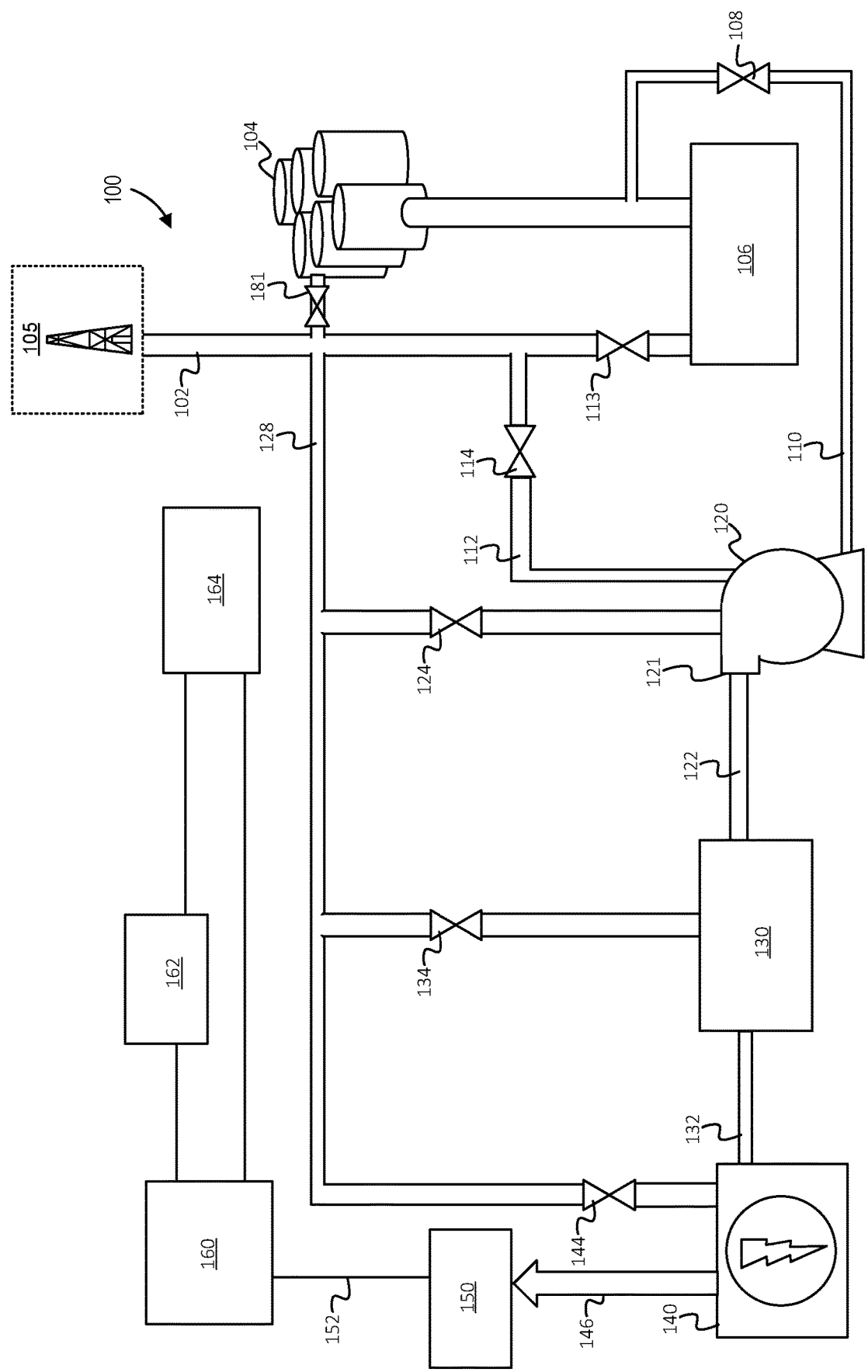
FIG. 1 is a schematic diagram of a production system having an intake-adaptable gas generator system to generate electricity from gaseous fluids using the present techniques, in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of power generation. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Hydrocarbon well systems often produce excess combustible gases at the site of a subsurface resource extraction operation. In many cases, these gases may not be viable for processing and transport off-site due to being of insufficient quantity or due to the lack of available infrastructure. In addition to gas obtained directly from a well, a significant amount of gas escapes from produced liquids via outgassing through changes in liquid level fluctuations, increases or decreases in internal tank pressure, or the like. Furthermore, fluid-handling operations at a well site or a fluid processing site may introduce atmospheric oxygen into a fluid mixture, which may cause equipment corrosion or require the use of oxygen removal equipment.

Some systems may resolve this issue by treating these combustible gases as a waste gas and burning (e.g., "flaring") these gases on the site of the resource extraction operation ("on-site"). However, gas flaring may be considered harmful or impractical in various environments. Moreover, such gases are energy-rich and may be harnessed to augment or replace other energy supplies for on-site operations. However, the unpredictability of gas flow from a subsurface environment or fluid storage tank ("fluid tank") filled with fluids from a subsurface environment can make conventional generators inappropriate for on-site power generation due to the possibility of generator damage or unreliable power generation.

Some embodiments may include an intake-adaptable gas generator system to supply power to an on-site well system. The intake-adaptable gas generator system may generate electricity from waste gas produced by a hydrocarbon well and adapt well operations to satisfy flow rate or concentration variation in gases produced by a hydrocarbon well. The intake-adaptable gas generator system may include a computing device or set of computing devices to modify a fluid control system of the intake-adaptable gas generator system based on a set of electrical measurements and fluid measurements. Some embodiments may obtain the set of electrical measurements from sensors measuring the activity of electrical components of the on-site well system or connected to the on-site well system. Some embodiments may obtain the set of fluid measurements from sensors measuring fluid properties, such as flow rate, pressure, temperature, composition, viscosity, or the like.

Some embodiments may perform operations to determine operational parameters of electrical components or fluid control devices based on predicted fluid flow rates or other fluid-related values or target values. Some embodiments may execute a target operating mode, where the target operating mode may include a quantitative value such as the target value, where the target value may include a set point for a fluid property or a target operational parameter of a device. Some embodiments may predict a fluid intake value (e.g., a volume to be acquired in a duration of time, a gas flow rate over a time series, or the like) based on the fluid measurements. Some embodiments may then determine a set of parameters for satisfying a target operating mode (e.g., by meeting a set point for a measurement or being within a threshold range of the set point) based on the predicted fluid intake values and electrical measurements. Some embodiments may then modify operations of the intake-adaptable gas generator system, where such modifications may include modifying a gas flow rate for a gas generator, a storage pressure for a fluid tank, or a load parameter for a compressor. Modifying operations of the intake-adaptable gas generator system may include injecting flare gas or other waste gas into a set of fluid tanks, such as scrubber tanks, where the fluid tanks may provide a positive pressure atmosphere.

The flare gas that is directed to a vapor destruction system may be diverted to a compression system when a set of tolerance criteria is met, where waste gases from various types of operations may be blended or otherwise combined. Some embodiments may blend produced waste gas, outgassed gases, other gases obtained from fluid tank vapors, or the like.

By using one or more operations or systems described in this disclosure, some embodiments may provide a method of efficiently using fluids from a well for power generation. Such operations may reduce the amount of excess fluids (e.g., methane gas, ethane gas, alcohol gases) being non-productively burned or released into the atmosphere burned. Furthermore, by providing electrical power to a well production system using a gas generator, some embodiments may reduce the amount of excess gas dissolved in a liquid or otherwise stored in a fluid tank used to transport liquid hydrocarbons. In addition, by reducing excess gas, some embodiments may increase operational efficiency and reduce corrosion in on-site or off-site equipment.

It should be noted that some items, such as a compressor or a gas generator, may be described as being connected by a set of conduits, such as a set of pipes, a set of open channels, a combination of pipes or open channels, or the like. As used in this disclosure, a first item may be connected to a second item via a set of conduits if a fluid may travel from the first item to the second item within the set of conduits, where different conduits of the set of conduits may be separated by tanks, fluid control devices, or other objects. For example, a generator may be connected to a compressor by a pair of pipes if the generator is connected to a fluid tank via a first pipe of the pair of pipes, and the fluid tank is connected to the compressor by a second pipe of the pair of pipes.

FIG. 1 is a schematic diagram of a production system having an intake-adaptable gas generator system to generate electricity from gaseous fluids using the present techniques, in accordance with some embodiments. The gas generator system 100 may receive fluids via the input pipe 102, which is attached to the hydrocarbon well 105 and provides gas produced by the hydrocarbon well 105. Additionally, or alternatively, the gas generator system 100 may include a set of fluid tanks 104 used to store fluids. Fluids from the input pipe 102 or the set of fluid tanks 104 may be provided to a vapor sink 106, where the vapor sink 106 may include a flare stack to burn or otherwise process vapors in a fluid. In some embodiments, fluid flow to the vapor sink 106 may be controlled through actuation of a valve 113. In some embodiments, fluids in the input pipe 102 may be redirected by a valve 114 into a vapor recovery compressor 120.

In some embodiments, fluids from the set of fluid tanks 104 may be redirected to the vapor recovery compressor 120 by manipulating a valve 108 to permit fluid to flow through a pipe 110. In some embodiments, fluids from the vapor recovery compressor 120 may be sent to a set of fluid tanks 130. As further discussed, additional liquid phase combustible materials or other materials may be isolated by the set of fluid tanks 130. Additionally, some embodiments may transport the additional liquid phase combustible materials through a valve 134 and into the liquid return pipe 128. A fluid mixture comprising gas-phase fluids from the set of fluid tanks 130 may be transported to a gas generator 140 via a generator inlet pipe 132, where the fluid mixture is used by the gas generator 140 to generate electrical energy. As shown by the gas generator system 100, the input pipe 102 may transport gas from the hydrocarbon well 105 to the set of fluid tanks 104. The set of fluid tanks 104 is connected to the generator inlet pipe 132 by other pipes or fluid control devices, such as a vapor output pipe 122 or the vapor recovery compressor 120. Furthermore, while not shown in FIG. 1, some embodiments may provide a direct connection between a pipe transporting gas from the hydrocarbon well 105 to the gas generator 140.

In some embodiments, the vapor recovery compressor 120 may send hydrocarbon vapors or other materials in the gas phase through the vapor output pipe 122. Additionally, or alternatively, the vapor recovery compressor 120 may output liquid phase hydrocarbons or other fluids in the liquid phase through a valve 124 into a liquid return pipe 128. Furthermore, in some embodiments, the fluid in the liquid return pipe 128 may be mixed with gas from the hydrocarbon well 105. Furthermore, as described elsewhere in this disclosure, the vapor recovery compressor 120 may receive exhaust fluid from the gas generator 140 as an input fluid, causing the fluid flowing through a compressor outlet 121 of the vapor recovery compressor 120 to be a recycled fluid mixture. As used in this disclosure, a recycled fluid mixture may include any fluid mixture that includes an exhaust fluid of a gas generator.

In some embodiments, operations of the gas generator 140 or other components of the gas generator system 100 may include obtaining sensor measurements and modifying component configurations based on the sensor measurements. Such sensor measurements may include fluid flow rate measurements obtained by flow meters, chemical sensors to detect the presence of compounds or concentration of compounds, pressure difference measurements obtained from differential pressure sensors positioned at different sides of a valve. For example, pressure sensors may be used to obtain a pressure difference across the valve 114 by measuring the pressure of fluids in the input pipe 102 and fluids in a fluid pipe 112.

As discussed further below, operations of the vapor recovery compressor 120 may be modified to satisfy a criterion based on a target value. The criterion may include a criterion that a measured or computed value is within a defined range of the target value, that the measured or computed value is greater than the target value, or that the measured or computed value is less than the target value. For example, some embodiments modify an operation of a fluid control device such as the valve 124 or the vapor recovery compressor 120 to satisfy a criterion that a power generation of a gas generator 140 is within a range (e.g., within 5%) of a target power generation value. Alternatively, some embodiments may modify an operation of a fluid control device in response to a determination that a gas consumption rate is less than a target gas consumption value.

Operations of the gas generator 140 may be controlled by an on-board computing device attached to the gas generator 140 may be remotely controlled by another computing device. For example, operations of the gas generator 140 may be controlled by modifying a parameter of the bidirectional inverter 150. In some embodiments, the gas generator 140 may consume fluid from the generator inlet pipe 132 to generate electricity that is transported through the wiring 146 and converted into direct current (DC) power via the bidirectional inverter 150, where the bidirectional inverter 150 may be used to account for predicted power requirement changes. For example, some embodiments may use the bidirectional inverter 150 to increase power generation by the gas generator 140 during a periodic increase in the power requirement of an oscillating pump jack. Additionally, some embodiments may transport fluid such as liquid phase fluid to be liquid return pipe 128 via the valve 144.

Some embodiments may include a second inverter 160 that is wired to the bidirectional inverter 150 via the wire 152, where the second inverter 160 may be used to generate a three-phase alternating current (AC) through the first wire 161. Some embodiments may also include a measurement of a current on-site electrical load of the on-site electrical load sensor 163. Some embodiments may then communicate the current from the second inverter 160 and the current measured by the on-site electrical load sensor 163 to an electrical service main controller 164. In some embodiments, the electrical service main controller 164 may receive measurements from an external electrical grid indicating an amount of power being provided by the external electrical grid (e.g., utility grid). In some embodiments, the electrical service main controller 164 may be in electrical communication with other components of an on-site set of components 162, which may include a pump jack, pressurizing equipment, workstation, hoisting system, or the like. As discussed further below, some embodiments may determine a target parameter, such as a target wattage, target electrical waveform, target current, target voltage, target gas consumption value, target gas storage value, or the like. Some embodiments may then modify operations one or more components of the gas generator system 100 to meet the target parameter.

As used in this disclosure, a measurement, such as an electrical measurement or fluid measurement, may include a direct measurement obtained from a sensor. Alternatively, or in addition, a measurement may include a measure based on a plurality of other measurements. For example, a fluid measurement may include a maximum value of a plurality of fluid measurements or a minimum value of a plurality of fluid measurements. Furthermore, a measurement may include a statistical measurement, such as a measure of centralized tendency (e.g., a mean average, a median, a mode, or the like) or a measure of dispersion (e.g., a variance, a standard deviation, or the like). Furthermore, as used in this disclosure, a sensor in communication with a conduit, a tank, another fluid vessel, or a well may measure one or more properties of a fluid in the conduit, tank, or other fluid vessel. For example, a first sensor that measures a fluid temperature, fluid pressure, or fluid flow rate through a pipe is in communication with the pipe. In some embodiments, a sensor may be attached to a conduit, tank, or well to measure a fluid in the conduit, tank, or well. For example, a resistivity sensor may be physically attached to an inner wall of a pipe. Alternatively, or in addition, a sensor may be physically detached from a conduit, tank, or well while still being in communication with the conduit, tank, or well. For example, an infrared temperature sensor may be used to obtain a temperature of a fluid flowing through a pipe without being physically attached to the pipe.

Figure 2:
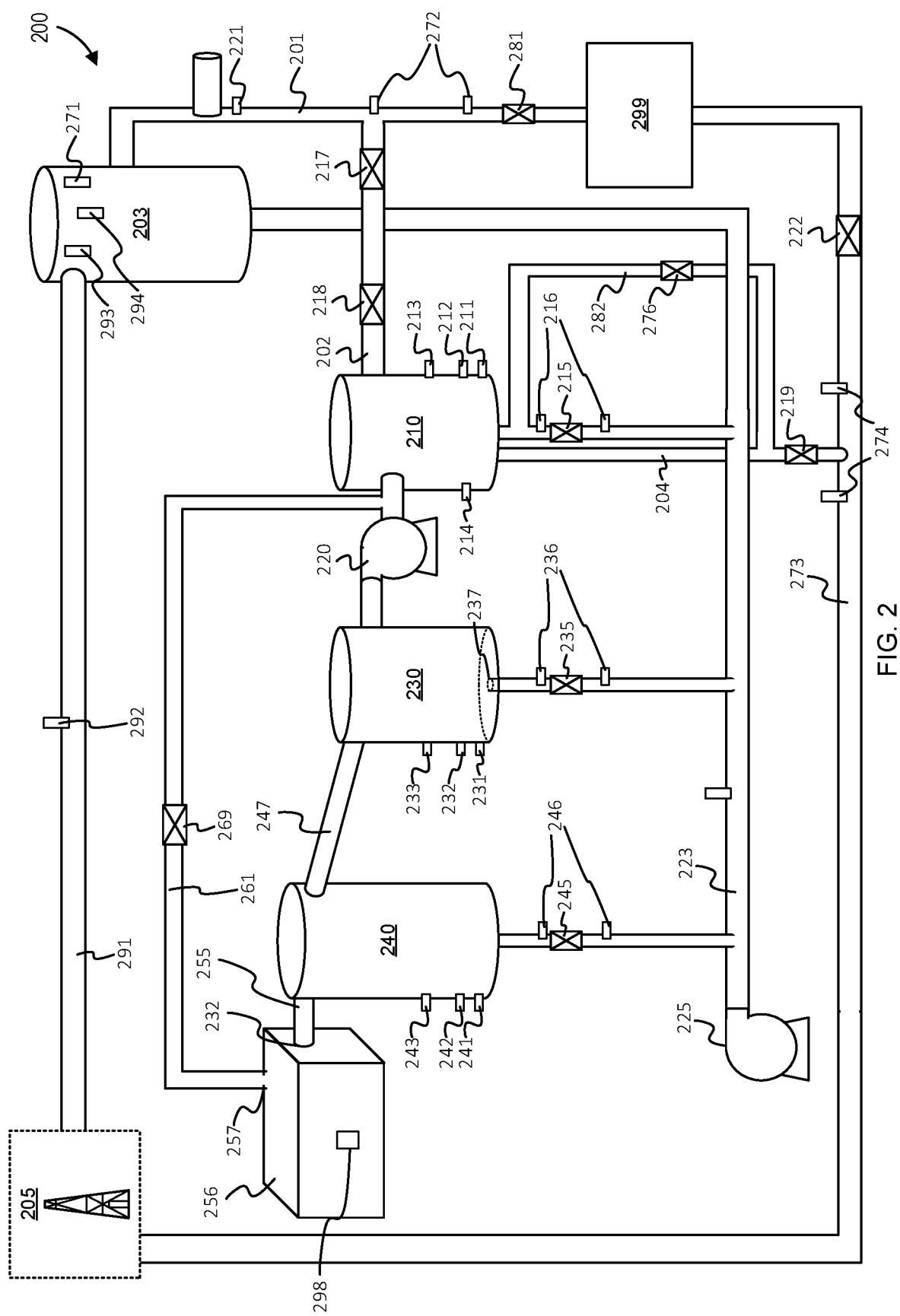
FIG. 2 is a schematic diagram of a portion of a gas extraction system of an intake-adaptable gas generator system, in accordance with some embodiments.

FIG. 2 is a schematic diagram of a portion of a gas extraction system of an intake-adaptable gas generator system, in accordance with some embodiments. An intake-adaptable gas generator system 200 may include a gas generator 256 to provide electrical energy to a set of components electrically connected to the gas generator. Such components may include a computing system(s) 298, a subset of computing devices of a computing system pumping devices or their controllers, workstations, digital displays, mobile devices, electric charging stations, or other electricity-consuming devices. The intake-adaptable gas generator system 200 may include a fluid inlet pipe 202 from a fluid tank 203 or a fluid inlet pipe 204 from a hydrocarbon well 205. The hydrocarbon well 205 may provide various fluids, such as water, oil, gases, or the like to a fluid tank 203 via a pipe 291. In addition, an exhaust fluid, such as a gas mixture of carbon dioxide and water vapor, of the gas generator 256 may be re-directed to a compressor 220 via the exhaust fluid pipe 258. The exhaust fluid of the gas generator 256 may be shunted through the generator outlet 257 through the exhaust fluid pipe 258, where the flow rate of the exhaust fluid mixture may be controlled by a valve 261. Furthermore, while not shown in FIG. 2, some embodiments may connect a generator outlet with other elements of the intake-adaptable gas generator system 200. Furthermore, in some embodiments, the fluid tank 203 may include hydrocarbon fluids provided from other sources. In some embodiments, the gas generator 256 may be provided with additional hydrocarbon fluids to use as fuel for the generation of electrical energy. For example, the gas generator 256 may be provided with a propane tank that may be used concurrently or separately from gas provided by the hydrocarbon well 205.

In some embodiments, the computing system(s) 298 may include a wireless network interface to receive and interpret wireless signals, where a wireless signal may include WiFi signals, cellular network signals, long-range radio signals, or the like. For example, the computing system(s) 298 may include a long range radio module to receive radio communication. One or more processors of the computing system(s) 298 may then determine a set of values using the wireless signals, where the set of values may include target values, operational parameters, program instructions, or the like. Some embodiments may then use the computing system(s) 298 to perform one or more operations described in this disclosure using components of the intake-adaptable gas generator system 200.

The fluid inlet pipe 202 may include fluid from a well, a fluid tank, another type of fluid vessel, or the like. For example, the fluid in the fluid inlet pipe 202 may include fluids transported from the fluid pipe 110 or the fluid pipe 112. Fluids from the fluid in the fluid inlet pipe 202 may enter the suction scrubber tank 210, which may include a low liquid sensor 211, high liquid sensor 212, or ultrahigh liquid sensor 213. While described a scrubber, it should be understood that the scrubber tanks 210, 230, or 240 may be replaced with other types of fluid tanks. Fluids may be separated at the suction scrubber tank 210 into a gas phase fluid and a liquid phase fluid. In some embodiments, the gas phase fluid may be transported into the compressor 220. In some embodiments, the gas phase fluid may be mixed with exhaust fluid from the gas generator 256 to form a recycled fluid mixture. Additionally, the liquid phase fluid may be sent into a liquid return pipe 223 by sending instructions to a controller operating a valve 215 that connects the liquid return pipe 223 to the suction scrubber tank 210. A differential pressure sensor 216 may provide a measurement of the pressure difference across the valve 215 or a measure of the fluid pressure(s) at either end of the valve 215. In some embodiments, a controller may actuate or otherwise modify the valve 215 to allow fluid to flow into a fluid tank 203.

In some embodiments, measurements from the set of sensors 211-213 may be used to modify an operation of the intake-adaptable gas generator system 200 or another component connected to the gas generator 256. For example, some embodiments may determine that a liquid level has satisfied a threshold liquid height based on measurements from the low liquid sensor 211 and, in response, open the valve 215 to a partially opened state. Additionally, some embodiments may determine that a liquid level is satisfied a second threshold liquid height based on measurements from the high liquid sensor 212 and, in response, open the valve 215 to a fully open state. In some embodiments, a tank purge pipe 282 may be used to connect fluids flowing from the suction scrubber tank 210 back into fluids flowing into the suction scrubber tank 210 or to another pipe.

In some embodiments, fluid sent to the compressor 220 may be compressed and transported to a discharge scrubber tank 230, where the fluid may be separated by the compressor 220 into a gas phase fluid and a liquid phase fluid. By using the compressor 220, some embodiments may increase the homogeneity or purity of an output gas phase fluid. Once sent to the discharge scrubber tank 230, the liquid phase fluid may be transported into the liquid return pipe 223 via the valve 235. Similar to the above, the liquid volume sensors 231-233 may be used to determine an operational parameter of a component of the intake-adaptable gas generator system 200 or another component connected to an on-site, gas generator. Some embodiments may include a differential pressure sensor 236 to provide a measure of the pressure difference across the valve 235 or a measure of the fluid pressure(s) at either end of the valve 235. In some embodiments, a controller may actuate or otherwise modify the valve 235 to allow fluid to flow into a fluid tank 203 via a fluid outlet 237 connected to the valve 235. In some embodiments, the fluid tank 203 may also include a tank pressure release valve 293 or tank hatch pressure relief element 294 to mitigate pressurization risks.

In some embodiments, the discharge scrubber tank 230 may be connected to a scrubber tank 240 via the tank connection pipe 247, where the scrubber tank 240 may serve as an additional scrubber. In some embodiments, the tank connection pipe 247 may be positioned between the discharge scrubber tank 230 and the scrubber tank 240, where the tank connection pipe 247 is at an angle with respect to a horizontal line between the discharge scrubber tank 230 and the scrubber tank 240. In some embodiments, the tank connection pipe 247 may be angled to reduce further the amount of fluid stored in a liquid phase in the scrubber tank 240 by allowing condensates to flow from the scrubber tank 240 back to the discharge scrubber tank 230. In some embodiments, liquid phase fluids of the scrubber tank 240 may be transported into the liquid return pipe 223 via a valve 245. Similar to the above, the liquid volume sensors 241-243 may be used to determine an operational parameter of a component of the intake-adaptable gas generator system 200 or another component connected to the gas generator 256. Some embodiments may include a differential pressure sensor 246 to provide a measurement of the pressure difference across the valve 245 or a measure of the fluid pressure(s) at either end of the valve 245. In some embodiments, a controller may actuate or otherwise modify the valve 245 to allow fluid to flow into a fluid tank 203 based on an operational parameter of the valve 245. For example, a controller may actuate the valve 245 to being 50% open based on an operational parameter of the valve 245 being equal to 50%. Furthermore, a pump 225 may be used to pump liquid in the liquid return pipe 223 into the fluid tank 203, where the liquid in the liquid return pipe may include liquid from the tanks 210, 230, or 240.

In some embodiments, gas-phase fluid from the scrubber tank 240 may be transported to a gas generator via a pipe 255. In some embodiments, the pipe 255 may directly connect to a generator inlet 232 of the gas generator 256. As discussed elsewhere in this disclosure, some embodiments may modify operations of one or more components of the intake-adaptable gas generator system 200 based on a target value, such as a measurable set point, a target operational parameter, or the like. For example, some embodiments may modify an operation of the gas generator 256 based on a target generator load, a target contribution to the power consumed by components electrically connected to the gas generator 256, or the like.

In some embodiments, other sensors may be used to obtain a set of measurements. The intake-adaptable gas generator system 200 may include a tank pressure sensor 271 to provide pressure measurements for the fluid tank 203 and a pipe pressure sensor 292 to obtain pressure measurements for fluid in the pipe 291. Differential pressure sensors may be used to provide a pressure difference between two different positions of the intake-adaptable gas generator system 200. For example, a differential pressure sensor 272 may be used to provide a differential pressure measurement for a pipe 201, which may be used to transport fluid (e.g., hydrocarbon vapors) from the fluid tank 203. Similarly, a set of differential pressure sensors 274 may be used to provide a differential pressure measurement for a pipe 273, which may be used to transport fluid (e.g., hydrocarbon vapors) from the hydrocarbon well 205.

In some embodiments, a set of fluid measurements may include fluid composition measurements obtained by a set of sensors. For example, an oxygen sensor 221 may be positioned on the pipe 201 to obtain oxygen concentrations measurement of fluid flowing from the fluid tank 203. The oxygen concentration measurements may include relative concentration measurements (e.g., such as percentage of atmospheric oxygen concentration) or absolute concentration measurements (e.g., parts per million). Similarly, the oxygen sensor 214 may provide oxygen concentration measurements of the suction scrubber tank 210. Various other oxygen sensors or other gas sensors (e.g., nitrogen, sulfur, or the like) may be positioned at pipes, tanks, or other vessels of the intake-adaptable gas generator system 200, where having oxygen concentration that are less than a lower threshold or greater than a high threshold may cause the injection or removal of oxygen in a fluid mixture, respectively.

In some embodiments, the vapor removal unit 299 may include a gas flaring system, a waste containment system, or other system to remove combustible gases from an intake-adaptable gas generator system. Some embodiments may describe the vapor removal unit 299 as a gas flare system, various other systems are possible. For example, some embodiments may use a subsurface injection system to inject vapor into an underground storage chamber.

In some embodiments, various valves may be actuated to modify pressures, flow rates, fluid recycle rates, or the like. A check valve 281 may control an amount of fluid to be sent to the vapor removal unit 299 from the fluid tank 203 via the pipe 201 and may be used to prevent fluid from leaving the vapor removal unit 299 through the pipe 201. Similarly, a check valve 222 may control an amount of fluid to be sent from the hydrocarbon well 205 to the vapor removal unit 299 via a pipe 273 and may be used to prevent fluid from leaving the vapor removal unit 299 through the pipe 273. A pressure regulator valve 217 may be used in conjunction with a shut-off valve 218 to control fluid flow from the fluid tank 203 to the suction scrubber tank 210. Similarly, a pressure regulator valve 219 may be used to regulate a pressure of fluid flowing from the hydrocarbon well 205 to the suction scrubber tank 210. In some embodiments, some or all of the valves described above may be controllable to adjust a maximum allowable pressure of a tank or other fluid-holding component of the intake-adaptable gas generator system 200. In some embodiments, one or more of the compressors or other pumps described above may be modified to change a tank pressure, change a temperature, or change a fluid flow rate (e.g., a gas flow rate into the gas generator 256).

Figure 3:
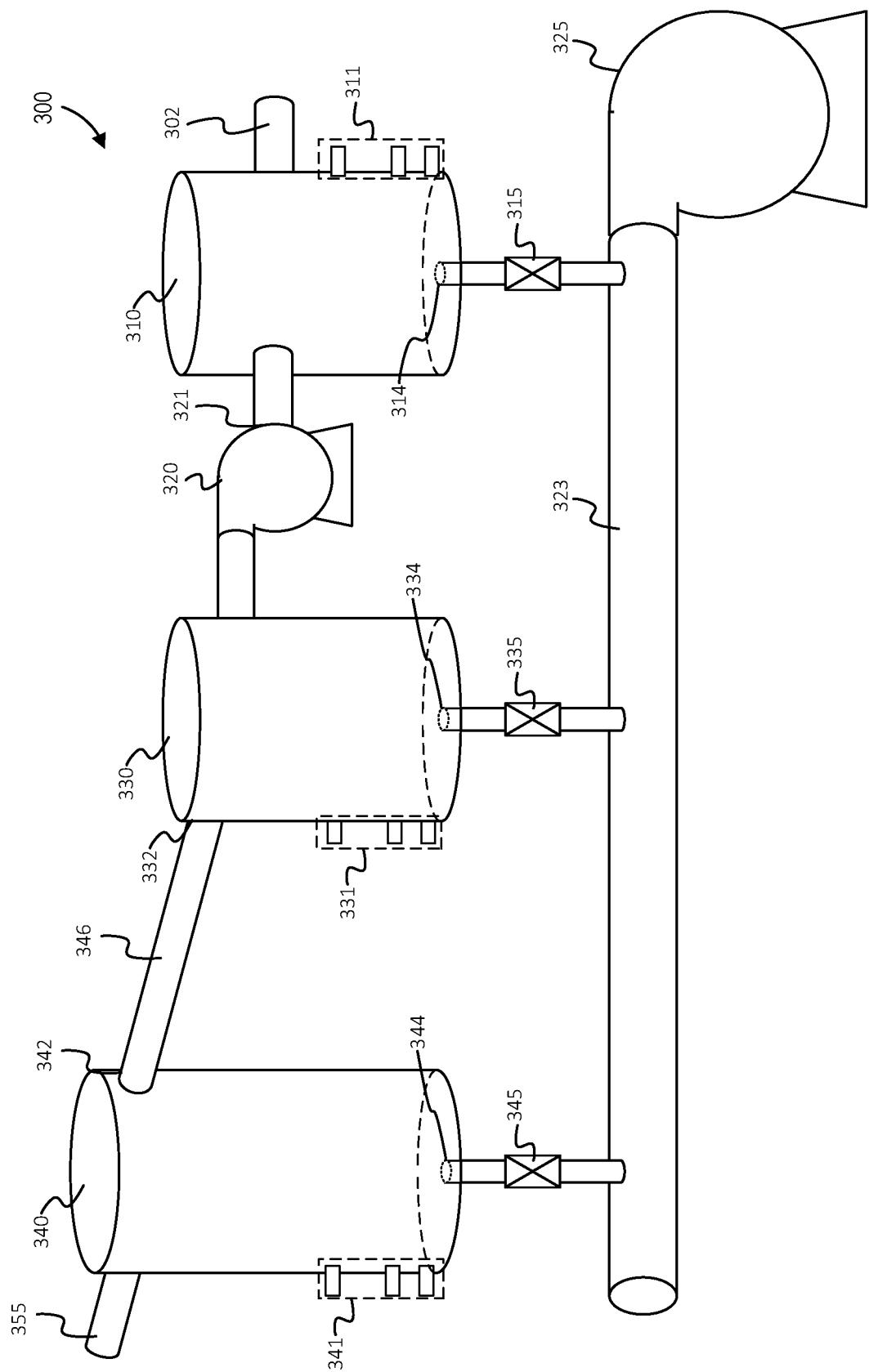
FIG. 3 is a schematic diagram of a set of fluid tanks and a compressor, in accordance with some embodiments.

FIG. 3 is a schematic diagram of a set of fluid tanks and a compressor, in accordance with some embodiments. In some embodiments, fluids produced by a gas well may be purified, filtered, or otherwise processed using a set of tanks and compressors. The schematic diagram 300 includes a first fluid tank 310, a first compressor 320, a second fluid tank 330, and a third fluid tank 340. Some embodiments may include an inlet pipe 302 that provides fluids from a hydrocarbon well or a generator gas outlet to the first fluid tank 310. The first compressor 320 may then compress fluids from fluids flowing out of the first fluid tank 310 into the compressor inlet 321, where the compressed fluids may then be sent to the second fluid tank 330. In some embodiments, measurements made by a set of sensors 311 may be used to modify a valve controlling a fluid flow rate into the first fluid tank 310, where the set of sensors 311 may include one or more sensors usable to determine an amount of a liquid in a tank (e.g., by determining the height of a liquid in the tank). For example, the set of sensors 311 may include a low liquid sensor, a high liquid sensor, or a high-high liquid sensor, each of which may be used to indicate a relative or absolute height of a liquid in the tank. In some embodiments, the first fluid tank 310 may be used as a suction scrubber tank to act as an initial vessel to receive fluids from a hydrocarbon well or exhaust fluid from a gas engine.

In some embodiments, fluid provided by the first compressor 320 may be provided to the second fluid tank 330, where the second fluid tank 330 may be used as a discharge scrubber to process fluids sent from the first compressor 320. Furthermore, the second fluid tank 330 may be connected to a third fluid tank 340 via a pipe 346, where the pipe 346 is connected to the second fluid tank 330 at an attachment point 332, and where the pipe 346 is connected to the third fluid tank 340 at an attachment point 342. In some embodiments, the attachment point 342 may be at a greater height compared to the attachment point 332, where the height difference may permit condensate to escape from the third fluid tank 340 back to the second fluid tank 330.

In some embodiments, sensor measurements provided by the set of sensors 311, the set of sensors 331, or the set of sensors 341 may provide various measures of fluid properties or fluid volumes of fluids in the fluid tanks 310, 330, or 340, respectively. Based on one or more sensor measurements, some embodiments may actuate one or more valves connected to one or more of the fluid tanks 310, 330 or 340. In some embodiments, the set of sensors 311, 331, or 341 may indicate that a threshold liquid volume has been reached by the respective fluid tank of the fluid tanks 310, 330, or 340. For example, the set of sensors 331 may include a high-high liquid sensor that provides a measurement that indicates whether a liquid volume of the second fluid tank 330 satisfies a valve-triggering threshold. In response to a determination that the measurement indicates that the liquid volume of the second fluid tank 330 satisfies the valve-triggering threshold, the valve 335 may be actuated. By actuating the valve 335, some embodiments may empty liquids stored in the second fluid tank 330 via the fluid outlet 334, where the fluid outlet is lower in height than the attachment point 332. Similarly, the valves 315 and the valve 345 may be used to empty liquids from the first fluid tank 310 via the fluid outlet 314 and the third fluid tank 340 via the fluid outlet 334, respectively. Some embodiments may empty liquids from the first fluid tank 310, second fluid tank 330, or third fluid tank 340 into a liquid return pipe 323, where a pump 325 may transport the liquid fluid into a liquid fluid tank, such as the fluid tank 203. Some embodiments may then collect fluid (e.g., hydrocarbon-rich gas) from the third fluid tank 340 for the purposes of combustion in a gas generator. As described elsewhere, some embodiments may mix this gas with other fluids such as atmospheric air, compressed exhaust fluid from a gas generator, or the like.

Figure 4:
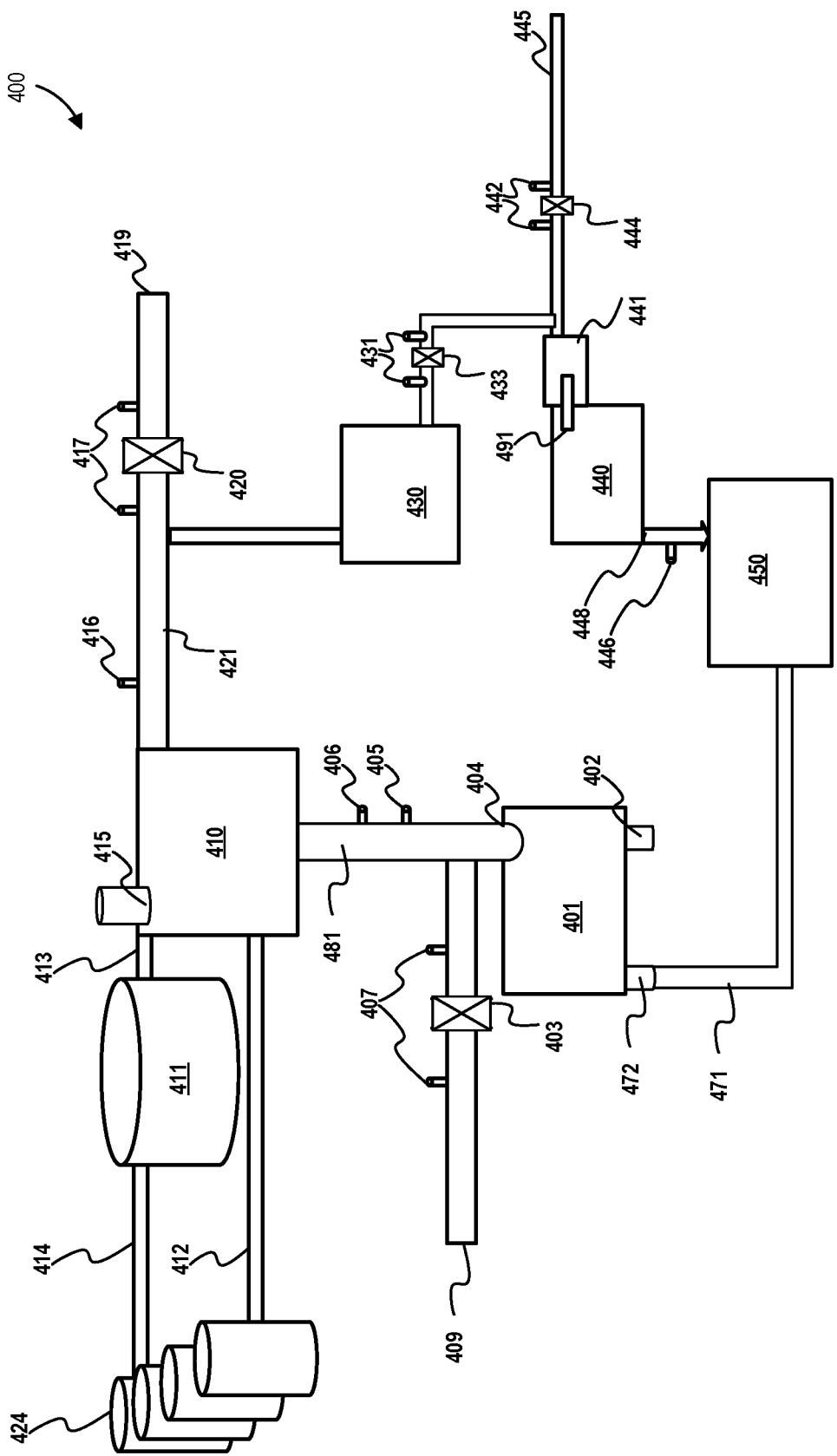
FIG. 4 is a schematic diagram of a gas generator with an integrated water collection system, in accordance with some embodiments.

FIG. 4 is a schematic diagram of a gas generator with an integrated water collection system, in accordance with some embodiments. FIG. 4 is a schematic diagram of a gas generator with an integrated water collection system. The schematic diagram 400 depicts a gas generator 401 receiving a first input gas via a generator inlet 402, where the data received via the generator inlet 402 may include a fluid mixture of gas provided by a hydrocarbon well and atmospheric air. The gas generator 401 may also receive a fuel intake via a pipe 471 that connects to a generator inlet 472 of the gas generator 401.

As described elsewhere in this disclosure, some embodiments may control operations of the gas generator 401 by increasing a power generation rate, turning on the gas generator 401, stopping the gas generator 401, or the like. Exhaust gas from the gas generator 401 may leave the gas generator 401 via the generator outlet 404, where the generator outlet 404 may be connected to a pipe 481. In some embodiments, fluid properties of fluids flowing from the generator outlet 404 may be measured by a temperature sensor 405, a nitrogen oxides sensor 406, or a pressure sensor 407. It should be understood that oxides may include any type of compound comprising at least one oxygen molecule. For example, nitrogen oxides may include nitrogen monoxide, nitrogen dioxide, or nitrogen trioxide. In some embodiments, a differential pressure sensor 407 may be used to obtain a differential pressure measurement. Some embodiments may determine whether a valve 403 should be actuated to permit fluid flowing from the generator outlet 404 to an atmosphere or a vapor destruction unit via a pipe 409 based on the differential pressure measurement. For example, a temperature measurement made by the temperature sensor 405 may exceed a temperature threshold, a set of nitrogen dioxide measurements made by the nitrogen oxides sensor 406 may exceed a nitrogen oxides threshold, or a pressure difference measured by the pressure sensors 407 and 408 may exceed a pressure threshold. In response, some embodiments may actuate the valve 403 to permit fluid to flow into a vapor destruction unit via a pipe 409.

The pipe 481 may connect to an evaporator 410, where the evaporator 410 may be used to evaporate water in fluid provided by the pipe 481. In some embodiments, the evaporator 410 may remove water from fluid provided by the gas generator 401, where water vapor may be released via a first evaporator outlet 415. Alternatively, or in addition, fluids from the evaporator 410 may be pumped or otherwise sent to a fluid tank 411 via a pipe 413, where the fluid tank 411 may be used to cool or concentrate fluid provided by the evaporator 410. Furthermore, it should be understood that while some embodiments may obtain fluid from a hydrocarbon well, other wells (e.g., water wells) may be used.

In some embodiments, the fluid may be filtered by a filter of the evaporator 410 or the fluid tank 411 to remove solid matter from the evaporator 410 or the fluid tank 411. In some embodiments, the removed solid matter may include various types of elements such as a transition metal such as cobalt or scandium, an alkali metal such as lithium, or other elements or compounds. The fluid tank 411 may provide the filtered fluid to the fluid tank 424. In some embodiments, filtered fluids from the fluid tank 424 may then be sent via a feed pipe 412 back to the evaporator 410 for additional processing or for cooling purposes. For example, the water flowing through the feed pipe 412 may be at a lesser temperature than the exhaust fluid flowing through the evaporator 410 as a result of convection or conduction. Some embodiments may increase a water flow through a set of pipes or other set of conduits running in the evaporator 410 to increase gas condensation or perform other cooling activity. For example, in response to a determination that an exhaust temperature is greater than a temperature threshold, some embodiments may increase a water flow through a set of pipes of the evaporator 410. Furthermore, in some embodiments, the evaporator 410 may include a gas condenser. As shown by the schematic diagram 400, exhaust fluid may be condensed by the evaporator 410 and transported through the pipe 421, where a temperature sensor 416 or a differential pressure sensor 417 may be used to provide fluid properties of any fluids flowing in the pipe 421 or in an exhaust pipe 419 that is connected to the pipe 421 via an exhaust bypass valve 420. Some embodiments may actuate or otherwise manipulate the exhaust bypass valve 422 to permit exhaust fluid to be vented via the exhaust pipe 419.

In some embodiments, the cooled exhaust fluid provided by the evaporator 410 may be sent to a heat exchanger 430, where the heat exchanger 430 may be used to further reduce the temperature of the cooled exhaust fluid. In some embodiments, external cooling fluids such as water from a local water source may be used to cool exhaust fluid flowing through the heat exchanger 430. Alternatively, or in addition, water from the set of fluid tanks 424 or other liquids that are at a lesser temperature than the exhaust fluid flowing through the heat exchanger 430 may be used to chill exhaust fluid flowing through the heat exchanger 430. Furthermore, some embodiments may increase a water flow or flow rate of other chilling fluid flowing through the heat exchanger 430 in response to a determination that exhaust gas temperature is greater than a temperature threshold. Exhaust gas or other fluid from the heat exchanger 430 may then be sent to a compressor 440, where a suction tank 441 may be used to draw fluids from the heat exchanger 430 and send the fluids to the compressor inlet 491 of the compressor 440.

In some embodiments, gas may flow through a fuel gas supply pipe 445 to send the gas into the compressor 440, where a pressure difference may be measured by a differential pressure sensor 442, and where a flow rate of fluid through the fuel gas supply pipe 445 is controlled by a valve 444. In some embodiments, the gas flowing through the fuel gas supply pipe 445 and the exhaust fluid sent from the heat exchanger 430 may be combined in the compressor 440, where the gas mixture may be sent out from a compressor outlet 448 to a set of fluid tanks 450. As described elsewhere in this disclosure, gas from the set of fluid tanks 450 may then be sent back to a gas generator for combustion and energy generation by the gas generator 401.

In some embodiments, the gas mixture sent out of the compressor 440 via the compressor outlet 448 may be measured by a sensor usable for detecting a target fluid property, such as an energy density sensor 446. For example, some embodiments may measure an amount of energy in British thermal units (BTU) of a volume of gas, such as a cubic foot. Various other units of energy density may be used, such as joules per cubic centimeter, kilowatt-hours per cubic meter, BTUs per cubic inch, or the like. Some embodiments may then modify an operation of the compressor 440 or one or more valves such as a valve 431 or a valve 432 to modify a proportion of gases of the gas mixture sent through the compressor outlet 448. For example, in some embodiments, the energy density sensor 446 may be a gas BTU meter, where the gas BTU meter may provide a measurement of gas BTU per cubic foot. Some embodiments may then compare the gas BTU meter measurement with a first threshold representing a minimum gas energy density and modify a compressor operational parameter or a valve parameter to increase the ratio of gas flowing from the fuel gas supply pipe 445 in the gas mixture relative to the exhaust fluid flowing from the heat exchanger 430. Alternatively, or in addition, some embodiments may determine whether a gas BTU meter measurement satisfies a second threshold representing a maximum gas energy density. In response to determining that the gas BTU meter measurement satisfies the second threshold, some embodiments may modify a compressor operational parameter or a valve parameter to decrease the ratio of gas flowing from the fuel gas supply pipe 445 in the gas mixture relative to the exhaust fluid flowing from the heat exchanger 430. By mixing exhaust fluid with data provided by the fuel gas supply pipe 445, some embodiments may account for cases where produced gas has a greater energy density than a safe energy density range of a gas generator.

Figure 5:
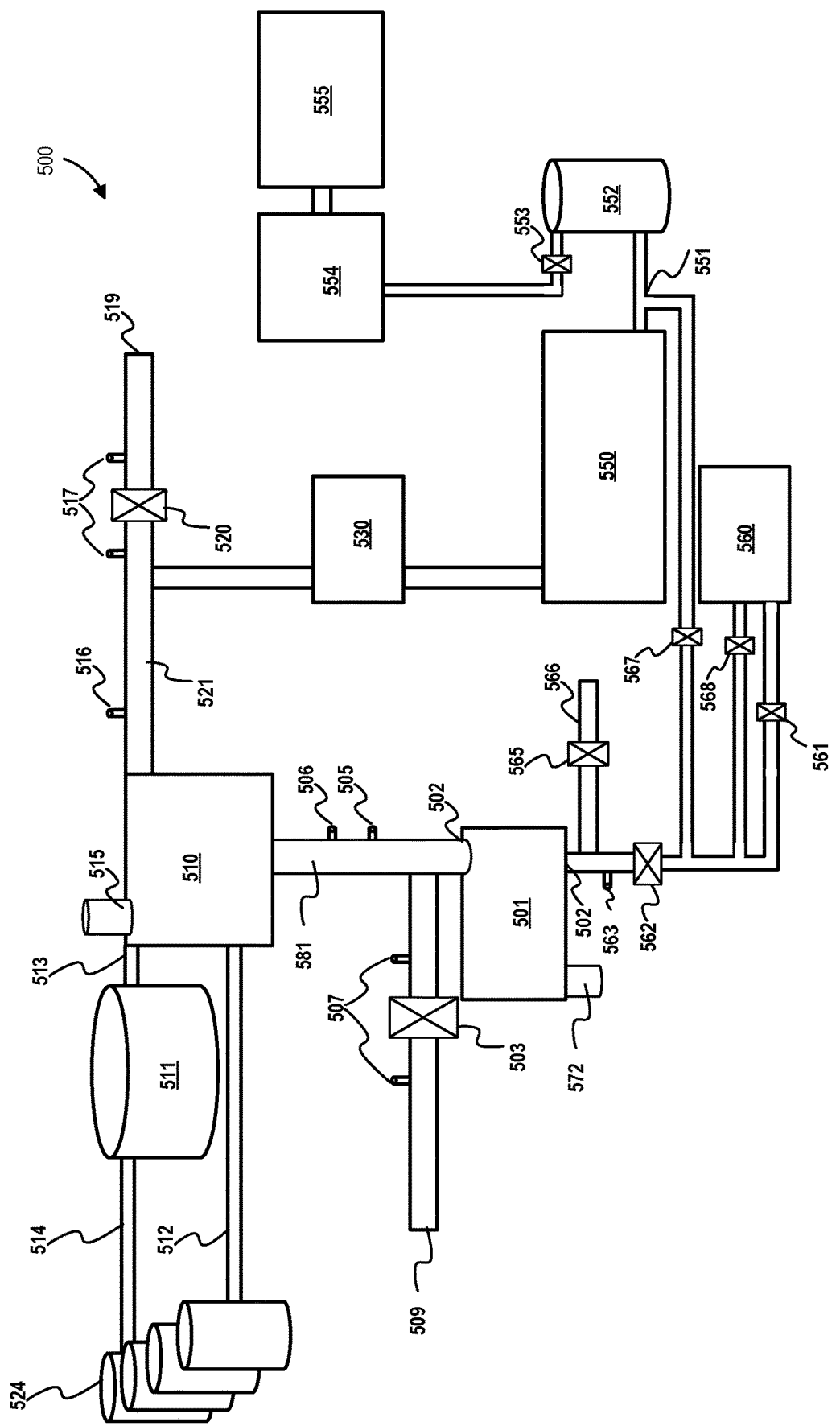
FIG. 5 is a schematic diagram of a gas generator with an integrated carbon dioxide production system, in accordance with some embodiments.

FIG. 5 is a schematic diagram of a gas generator with an integrated carbon dioxide production system, in accordance with some embodiments. The schematic diagram 500 depicts a gas generator 501 receiving a first input gas via a generator inlet 502, where the data received via the generator inlet 502 may include a fluid mixture of gas provided by a hydrocarbon well and atmospheric air. The gas generator 501 may also receive a fuel intake via a pipe 571 that connects to a generator inlet 572 of the gas generator 501. While not shown in FIG. 5, the generator inlet 572 may receive a recycled fluid mixture provided by a compressor, as described elsewhere in this disclosure.

As described elsewhere in this disclosure, some embodiments may control operations of the gas generator 501 by increasing a power generation rate, turning on the gas generator 501, stopping the gas generator 501, or the like. Exhaust gas from the gas generator 501 may leave the gas generator 501 via the generator outlet 504, where the generator outlet 504 may be connected to a pipe 581. In some embodiments, fluid properties of fluids flowing from the generator outlet 504 may be measured by a temperature sensor 505, a nitrogen oxides sensor 506, or a differential pressure sensor 507. In some embodiments, a differential pressure measurement made by the differential pressure sensor 507 may be used to determine whether a valve 503 should be actuated to permit fluid flowing from the generator outlet 504 to be exhausted to an atmosphere or a vapor destruction unit via a pipe 509.

In some embodiments, the pipe 581 may connect to an evaporator 510, where the evaporator 510 may be used to evaporate water in fluid provided by the pipe 581. Similar to other embodiments described in this disclosure, the evaporator 510 may remove water from fluid provided by the gas generator 501, where water vapor may be released via a first evaporator outlet 515. Alternatively, or in addition, fluids from the evaporator 510 may be pumped or otherwise sent to a fluid tank 511 via a pipe 513, where the fluid tank 511 may be used to cool or otherwise concentrate fluid provided by the evaporator 510.

In some embodiments, the fluid may be filtered by a filter of the evaporator 510 or the fluid tank 511 to remove solid matter. In some embodiments, the removed solid matter may be collected from the evaporator 510 or the fluid tank 511. The fluid tank 511 may provide fluid to the fluid tank 524, where the fluid may include concentrate overflow from the fluid tank 511. In some embodiments, fluids from the fluid tank 524 may then be sent via a pipe 512 back to the evaporator 510 for additional processing or for cooling purposes. Furthermore, in some embodiments, the evaporator 510 may also include or instead be a gas condenser. As shown by the schematic diagram 500, exhaust fluid may be condensed by the evaporator 510 and transported through the pipe 521, where a temperature sensor 516 or a differential pressure sensor 517 may be used to provide fluid properties of any fluids flowing in the pipe 521 or in exhaust pipe 519 that is connected to the pipe 521 via an exhaust bypass valve 520. Some embodiments may actuate or otherwise manipulate the exhaust bypass valve 520 permit exhaust fluid to be vented via the exhaust pipe 519.

In some embodiments, the cooled exhaust fluid provided by the evaporator 510 may be sent to a heat exchanger 530, where the heat exchanger 530 may be used to further reduce the temperature of the cooled exhaust fluid. In some embodiments, external cooling fluids such as water from a local water source may be used to cool exhaust fluid flowing through the heat exchanger 530. Alternatively, or in addition, water or other liquids from the set of fluid tanks 524 may be used to chill exhaust fluid flowing through the heat exchanger 530. Exhaust gas or other fluid from the heat exchanger 530 may then be sent to a compressor 540, where a suction tank 541 may be used to draw fluids from the heat exchanger 530.

In some embodiments, cooled exhaust fluid may be sent from the heat exchanger 530 to a carbon dioxide processing system 550, where the carbon dioxide processing system 550 may extract carbon dioxide from the exhaust fluid. In some embodiments, the carbon dioxide processing system 550 may include a gas pressurizer to pressurize the exhaust fluid to form liquid carbon dioxide. For example, the carbon dioxide processing system may use a gas pressurizer to pressurize a gas to a pressure greater than 5000 kilopascals (e.g., 5600 kilopascals) to generate liquid carbon dioxide. Some embodiments may include filters to collect carbon dioxide or filter out other gases. Some embodiments may transport the liquid carbon dioxide to a carbon dioxide fluid tank 552 via a set of pipes 551, where a carbon dioxide blending valve 567 may be used to control an amount of carbon dioxide that is redirected into an air intake for the gas generator 501, as described elsewhere in this disclosure. Some embodiments may then supply a solid carbon dioxide production system 554 with liquid carbon dioxide from the carbon dioxide fluid tank 552. The solid carbon dioxide (i.e., "dry ice") may then be transported to a dry ice repository 555 for later removal.

In some embodiments, a gas source 560 may be used to provide a set of gases such as oxygen gas, an inert gas (e.g., argon gas), or the like. The gas source 560 may include an oxygen generation plant, a noble gas fluid tank, or other sources of one or more gases. Some embodiments may control an amount of oxygen gas or inert gas of a gas mixture provided by the gas source 560 using a set of valves such as an oxygen blending valve 561, an inert gas blending valve 568, or the carbon dioxide blending valve 567. Some embodiments may modify the concentration of gases based on measurements made by a gas sensor 563, where the gas sensor 563 may include an oxygen sensor, a carbon dioxide sensor, a hydrocarbon gas sensor, or the like. Some embodiments may control the proportion of gases of the gas mixture, where the gases may include fluids provided by the set of pipes 551 or fluids provided by atmospheric air flowing through the pipe 566. Some embodiments may control the proportions of mixing or the flow rates by actuating one or more of a valve 562 or a valve 565, where the valve 562 may control a flow rate of fluid flowing from the set of pipes 551 to the generator inlet 502, and where the valve 565 may control a flow rate of fluid flowing from the pipe 566 to the generator in the 502.

EXAMPLE FLOWCHART

Figure 6:
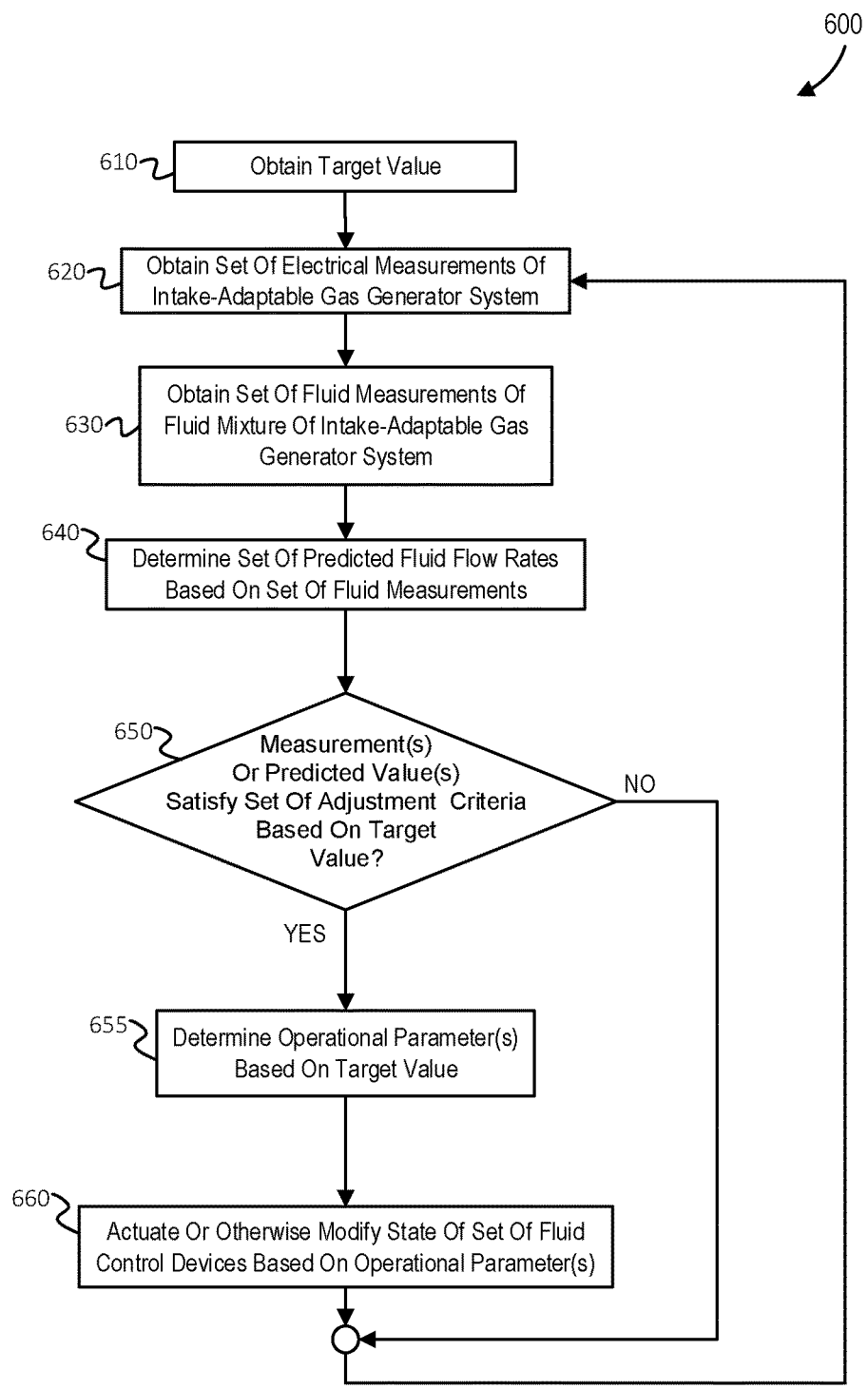
FIG. 6 is a flowchart of operations to satisfy a set of criteria based on a target value of an intake-adaptable gas generator system, in accordance with some embodiments.

FIG. 6 is a flowchart of operations to satisfy a set of criteria based on a target value of an intake-adaptable gas generator system, in accordance with some embodiments. In some embodiments, the process 600, like the other processes and functionality described herein, may be implemented by an entity-tracking system that includes computer code stored on a tangible, non-transitory, machine-readable medium, such that when instructions of the code are executed by one or more processors, the described functionality may be effectuated. Instructions may be distributed on multiple physical instances of memory, e.g., in different computing devices, or in a single device or a single physical instance of memory, all consistent with use of the singular term "medium." In some embodiments, the operations may be executed in a different order from that described. For example, while the process 600 is described as performing the operations corresponding to block 620 before performing the operations corresponding to block 630, some embodiments may perform the operations corresponding to block 630 before performing those corresponding to block 620. In some embodiments, operations may be executed multiple times per instance of the process's execution, some operations may be omitted, additional operations may be added, some operations may be executed concurrently and other operations may be executed serially, none of which is to suggest that any other feature described herein is not also amenable to variation.

In some embodiments, the process 600 may include obtaining a target value, as indicated by block 610. In some embodiments, the target value may be associated with a selected operating mode of the intake-adaptable gas generator system. For example, the target value may be associated with written descriptions such as "consume a maximum amount of produced gases," "maximize power generation," or "prevent power use of energy from external grid systems from reaching threshold value" in a stored data table. The target value may be stored as an absolute value, a relative percentage of a pre-set constant, or the like. In some embodiments, an operating mode may be configured for the operations of an intake-adaptable gas generator system. For example, some embodiments may modify operational parameters of one or more components of the intake-adaptable gas generator system to satisfy a set of criteria based on a target value while keeping other parameters or measurements within a pre-set range.

Some embodiments may obtain a target value as a set point, such as a set point corresponding to a target power output. The target value may be stored as an absolute target power output, a relative percentage of a power output constant, or the like. For example, some embodiments may execute instructions causing a gas generator to produce 100% of a pre-set constant power generation equal to 5 kilowatts. In some embodiments, the power generation rate may change over time, where the goal of the power generation rate is to keep a total amount of power being provided by an external electrical system (e.g., a utility grid system) below a threshold value. For example, a pump jack may oscillate between using 40 kilowatts (kW) to 5 kW in a pumping cycle. The target value may then dynamically change to supplement energy use greater than 10 kW such that the target power output is 0 kW for the duration when the pump jack is using between 5-10 kW, and such that the target power output changes between 0 kW to 30 kW when the pump jack is between using between 10 kW to 40 kW.

Some embodiments may be configured to an operating mode to satisfy a target gas consumption amount, where a target value of the operating mode may include a value indicating a consumption amount. For example, an operating mode of some embodiments may be configured to consume 100% of hydrocarbon gas being produced by a hydrocarbon well, where the target parameter may be equal to 100% or be equal to a different amount of a gas being produced by the hydrocarbon well. Such operating modes may be useful in environments that do not permit gas flaring or other forms of gas destruction. Furthermore, in some embodiments, the target gas consumption amount may vary based on other factors, where a portion of gas produced by a hydrocarbon well may be diverted to a fluid tank or pipeline for transport away from a hydrocarbon production field. As described elsewhere in this disclosure, various operating parameters of fluid control devices or other components of an intake-adaptable gas generator system may be actuated or otherwise modified to satisfy a set of criteria based on a target value. For example, some embodiments may satisfy a criterion based on a target value by increasing an allowable storage pressure of a fluid tank, modifying a load of a compressor, actuating a valve to change an amount of a fluid mixture used to fuel the gas generator or change a composition of the fluid mixture, or the like.

In some embodiments, the target value, instructions to use the target value, or program code to perform one or more operations described in this disclosure may be obtained from a remote computing device. For example, some embodiments may receive a wireless signal (e.g., a cellular signal, a WiFi signal, a long-range radio signal, etc.) from a cell tower via a wireless signal receiver. The wireless signal may include a target value and a set of data associated with the target value. Some embodiments may then use an on-site computing device, such as a set of controllers, to perform one or more operations described in this disclosure based on the target value.

In some embodiments, the process 600 may include obtaining a set of electrical measurements of an intake-adaptable gas generator system, as indicated by block 620. The set of electrical measurements may include one or more types of electrical measurements, such as a current measurement, voltage measurement (e.g., a root mean square voltage in an alternating current), amperage measurement, or the like. Alternatively, or in addition, the set of electrical measurements may include other measures or properties of electrical power such as a positive or negative power flow, an amount of active power being supplied, an amount of reactive power, an amount of apparent power, or the like. Some embodiments may include specific measurements indicating a total amount of power being acquired or provided by a generator or inverter on-site electrical components or electrical grid connected to the intake-adaptable gas generator system. For example, some embodiments may include specific measurements of a total amount of power being acquired from an electrical grid system or provided to an electrical grid system. In addition, some embodiments may use the amounts of power or energy to determine a cost of the power being bought or sold via an energy-to-price weighting factor or function. Furthermore, as described elsewhere in this disclosure, some embodiments may provide measurements of power or energy being provided or sold to a grid system.

Some embodiments may obtain measurements over a period of time or processes measurements to indicate changes in power consumption based on on-site operations. For example, some embodiments may obtain measurements indicating power oscillation reflecting the loading and unloading phases of a pump jack or other types of motorized oscillating equipment. As described elsewhere in this disclosure, motorized oscillating equipment may have a corresponding oscillating power requirement, where the oscillating power requirements may exceed threshold amounts in one portion of a corresponding oscillation cycle and fall below threshold amounts in another portion of the corresponding oscillation cycle. Some embodiments may correspondingly cycle power generation using one or more inverters to compensate or otherwise account for periodic changes in a power requirement.

Alternatively, or in addition, the set of electrical measurements may include a current frequency measurement(s), an electrical phase sequence measurement(s), a power factor measurement(s), electrical harmonics measurement(s) (e.g., current harmonics, voltage harmonics, or the like), electrical inter-harmonics measurement(s), total harmonic distortion measurement(s), measurement(s) of individual phase waveforms, or the like. For example, some embodiments may determine a phase measurement, a current harmonics measurement, and a total harmonic distortion of electricity being provided to a set of controllers or other computing devices attached to an on-site well control system. As discussed further below, some embodiments may use electrical measurements to detect possible system issues such as faulty wiring, system damage, system misuse, system overuse, electrical overloads, or the like. For example, some embodiments may measure harmonics in an electrical line connected to a variable speed generator. A determination that a harmonic measurement exceeds a harmonic range threshold may indicate that the generator is being operated at a power generation rate causing generator oscillations. Some embodiments may measure harmonic distortions or other interharmonic measurements and group the measurements into one or more specific frequency ranges. These frequency ranges may then be used to categorize or otherwise detect one or more issues based on the frequency range corresponding with a harmonic distortion. For example, some embodiments may determine that an electrical component of a pump is corroded, shut down, or otherwise defective based on a determination that a harmonic distortion is within a first frequency range and not within a second frequency range. In addition, some embodiments may determine a total harmonic distortion based on individual frequency range measurements.

In some embodiments, the set of electrical measurements may include phase waveform measurements. For example, some embodiments may determine phase waveform measurements of electrical outputs by a gas generator during a calibration or testing phase to detect possible issues related to an initial setup. For example, some embodiments may detect a set of localized spikes in an electrical output waveform and generate a mapping between different types of waveforms and different types of events. Alternatively, or in addition, some embodiments may detect a phase waveform during later power generation operations. As described elsewhere in this disclosure, some embodiments may use these waveform measurements to diagnose or detect gas-related issues and update gas-related processing parameters, such as a compressor parameter or valve parameter.

In some embodiments, multiple electric meters may be used to obtain one or more electrical measurements at one or more positions of an intake-adaptable gas generator system. Some embodiments may provide measurements corresponding to a total amount of AC power from the generator to a set of power destinations. For example, some embodiments may provide an amperage and the frequency of the AC power being provided by a gas generator. Some embodiments may provide electrical measurements corresponding to the power supplied to each of a set of power destinations. For example, if an inverter is used to provide AC power to a set of three different components (e.g., three different DC power supplies), some embodiments may obtain current measurements, voltage measurements, amperage measurements, power measurements, or other electrical measurements for each of the three different components. Some embodiments may provide electrical measurements corresponding to one or more of the inverters used to convert AC power to DC power or DC power to AC power. For example, some embodiments may provide a measurement of the amount of AC power supplied by a generator to an inverter and a measurement of the amount of DC power provided by the inverter that was converted from the AC power. Some embodiments may provide electrical measurements power connections to other electrical power sources such as an electrical grid power supply, an on-site solar array, on-site battery system, or the like. For example, some embodiments may provide frequency measurements, electrical power output measurements, or other electrical measurements of one or more inverters connected to an electrical grid power supply.

In some embodiments, the process 600 may include obtaining a set of fluid measurements of a fluid mixture of the intake-adaptable gas generator system, as indicated for block 630. The set of fluid measurements may include measurements of absolute pressure, relative pressure, differential pressure, oxygen, fluid flow, temperature, fluid composition (e.g., an amount of oil, gas, or water in a tank or pipe), or the like. For example, some embodiments may obtain measurements of a temperature and pressure at a gas fluid tank and pressures of a fluid at an inflow position and outflow position of a compressor.

The set of fluid measurements may be obtained from one or more sensors distributed through an intake-adaptable gas generator system. Some embodiments may obtain measurements from sensors positioned across valves separating different sections of an intake-adaptable gas generator system. For example, some embodiments may obtain measurements of a pressure difference across a first valve between a fluid tank and a compressor used to compressed gas into a first gas fluid tank. Some embodiments may obtain measurements from sensors positioned in proximity of or inside of an electronic or mechanical component. For example, some embodiments may obtain measurements corresponding to a suction pressure of a pump, a discharge pressure of the pump, a compressor recycle value, or the like. For example, some embodiments may obtain measures of a compressor discharge pressure and a pressure of a fluid tank, where the fluid tank stores gases discharged from the compressor after passing a valve.

The set of fluid measurements may include measurements correlated with a fluid composition, such as a relative measure or absolute measure of a specific fluid, fluid type, phase of matter, or the like. For example, some embodiments may obtain a measure of the amount of oxygen (e.g., in measurements of parts per million) in a pipe, an open flow channel, another type of conduit, fluid tank, or another component of the intake-adaptable gas generator system. As described further below, measures of oxygen may be used to determine if an amount of gas may be safely stored or if operational parameters should be modified in cases where an oxygen concentration measurement exceeds a threshold.

The set of fluid measurements may include a measurement resulting from computation using one or more other measurements as an input. For example, some embodiments may obtain a measure of centralized tendency (e.g., a mean average, a median, a mode, or the like) of pressure for a fluid in a pipe, tank, or another vessel during an event, a predetermined period of time, or the like. As discussed further below, some embodiments may determine that one or more operational parameters should be modified based on the mean average pressure or some other measurement.

In some embodiments, the process 600 may include determining a set of predicted fluid flow rates based on the set of fluid measurements, as indicated for block 640. Some embodiments may predict a fluid flow rate of a hydrocarbon well based on the set of fluid measurements by determining a current amount of gas being consumed, a current amount of gas provided to one or more fluid tanks and determining changes in either or both values over a period of time. For example, some embodiments may obtain a sequence of pressure measurements from a sensor that measures fluid properties of a fluid coming out of a hydrocarbon well. Based on the pressure measurements, some embodiments may then predict fluid flow rates, as described elsewhere in this disclosure. Furthermore, some embodiments may determine a sequence of predicted power outputs based on the set of predicted fluid flow rates using statistical or machine-learning operations.

Various specific operations or algorithms may be used to determine a predicted fluid flow rate of fluid being extracted from a hydrocarbon well. In some embodiments, a set of values that contribute to an expected fluid flow rate (i.e., "trim values") may be used to determine a set of predicted fluid flow rates, which may be ordered over a duration as a sequence of predicted fluid flow rates. Some embodiments may determine a trim value for one or more system factors, where a system factor may be determined based on a measurement or parameter. For example, some embodiments may determine a first trim value correlating a portion of a fluid flow rate with an average main suction pressure, a second trim value correlating for a second portion of the fluid flow rate with a pressure of fluid coming from production equipment, or a trim value correlating a third portion of the fluid flow rate with the pressure of a compressor liquid condensate.

In some embodiments, the effects correlated with a fluid flow rate by the first trim value may be determined based on a measured gas generator load, a commanded load of a gas generator, a ratio of a storage pressure to a target storage pressure, and a compressor load. For example, some embodiments may determine a quantitative value associated with the first trim value based on a measured gas generator load of 80%, a commanded gas generator load of 100%, a storage-pressure-to-target-storage-pressure ratio of 0.8, and a compressor load of 100%, where each value may be used to generate a combined score that is weighted by the first trim value. Some embodiments may determine the effect of the combined score empirically, such as by observing changes in the above-listed quantities and determining their corresponding effect on a fluid flow rate.

Some embodiments may determine effects correlated with the fluid flow rate by the second trim value based on pressure measurements or temperature measurements. Some embodiments may observe measurements corresponding with the start of fluid flow in a hydrocarbon well, stop of fluid flow in the hydrocarbon well, a peak pressure or temperature of a fluid being removed from the hydrocarbon well, a measure of central tendency of the measurements over a duration, or the like. For example, some embodiments may use an empirically determined correlation between average pressure or temperature measurements of fluid being stored in a fluid tank and a flow rate to predict future flow rate changes. Some embodiments may use detected changes in the pattern of the measurements (e.g., helical changes in measurements) to predict future changes in a fluid flow rate. Alternatively, or in addition, some embodiments may determine effects correlated with the fluid flow rate by the third trim value based on pressure measurements or temperature measurements of a liquid condensate. For example, some embodiments may determine a pressure and temperature of a liquid condensate by using sensors attached to a liquid return line, such as the liquid return pipe 128.

In some embodiments, trim values may be set as absolute values, relative values, or the like. The trim values may be used as weighting factors to determine a magnitude of an effect on a predicted fluid flow rate. For example, some embodiments may normalize each of a set of system factors to a specified predicted fluid flow rate or predicted gas contribution variable, where changes in a normalized system factor value may be weighted by a trim value determine an updated predicted gas value usable for determining a predicted fluid flow rate. In addition, a trim value may be continuously adjusted over time and may be used to adjust operational parameters.

In some embodiments, various other weighting factors may be used to predict the effect that a measurement or set of measurements may have on a flow rate, fluid property, or another sensor measurement of an intake-adaptable gas generator system. For example, some embodiments may determine that a 10% increase in an amount of power being consumed by a compressor corresponds with a 15% increase in the consumption of gas. In response, some embodiments may update a corresponding weighting factor to indicate that a 10% increase in the compressor load causes a 15% increase in a gas consumption rate. By providing a means of accounting for the effect that any number or types of measurements or operational parameters may have on a predicted fluid flow rate, some embodiments may provide a robust method of optimizing the performance of an intake-adaptable gas generator system.

In some embodiments, the process 600 may include determining whether a set of measurements or predicted values based on the measurements satisfy a set of adjustment criteria based on the target value, as indicated by block 650. In some embodiments, determining whether the set of measurements satisfy the set of adjustment criteria may include determining whether a measurement or value computed from a measurement satisfies a criterion based on a target value, such as matching a target value, being less than a target value, being greater than a target value, or the like. In response, some embodiments may determine that the adjustment threshold is satisfied. For example, a target value may be a relative target power output that includes the value "100%" to indicate that an operational parameter of a gas generator is configured to cause the gas generator to produce power at 100% of its rated power generation capacity (e.g., 10 kW, 50 kW, or the like). As described elsewhere in this disclosure, differences between a measured value and a target value may cause one or more changes to the configuration of a gas generator system. For example, if a measured power generation rate is 40 kW and the generator's power generation capacity is recorded at 80 kW, some embodiments may determine that the generator load is at 50% and that the target power output does not match the measured value. In response, some embodiments may determine that the adjustment threshold is satisfied.

In some embodiments, determining whether a set of predicted values based on the measurements satisfy an adjustment criterion may include determining whether a predicted power output of the sequence of predicted power outputs satisfies a criterion of the target power output. For example, some embodiments may determine that a sequence of predicted power outputs includes a predicted power output equal to 300 kW corresponding with a future time 8 AM. Some embodiments may determine that the predicted power output is less than a target power output, and thus that the sequence of predicted power outputs satisfies an adjustment criterion based on the target power output. In response, some embodiments may increase an amount of fluid stored in a fluid tank, such as by actuating a valve of the fluid tank. An increase in the amount of storage allocated to fluid storage may increase the time for which a required power output may be maintained.

In some embodiments, determining whether the set of measurements satisfy the set of adjustment criteria may include determining whether an electrical measurement satisfies an electrical measurement criterion. For example, some embodiments may determine that an adjustment criterion is satisfied in response to a determination that a harmonic measurement is outside of a harmonic range. In some embodiments, determining that the harmonic measurement is outside of the harmonic range may include determining that a total harmonic distortion is greater than a total distortion threshold. Alternatively, determining that the harmonic measurement is outside of the harmonic range may include determining that a total harmonic distortion is greater than a total distortion threshold or that a specific frequency of a distortion is greater than a corresponding distortion threshold. As described elsewhere in this disclosure, some embodiments may consequently reduce a load on a gas generator, such as by reducing a gas intake amount by manipulating a valve or decreasing a compressor load.

In some embodiments, determining whether the set of measurements satisfy the set of adjustment criteria may include determining whether a concentration or presence of a specific element or compound satisfies a set of criteria based on the target value. For example, some embodiments may determine whether a sulfide content of a gas satisfies a threshold, where a determination that the sulfide content of the gas satisfies the threshold may cause the actuation of a valve to direct the gas through a sulfide scrubbing module or otherwise change the flow of the gas. In some embodiments, re-directing the flow of the gas may change an endpoint of the gas. For example, after a determination that a fluid mixture has a hydrogen sulfide concentration that is greater than a sulfide threshold, some embodiments may re-direct the gas to poisonous gas fluid tank while fluids having a hydrogen sulfide concentration that do not satisfy the sulfide threshold may be sent to a gas pressurizer. Alternatively, or in addition, some embodiments may determine whether a hydrocarbon concentration measurement or carbon monoxide concentration measurement of an exhaust gas is greater than a threshold, and, in response to a determination that the hydrocarbon concentration measurement is greater than the threshold, increase an oxygen concentration of a fluid mixture entering a gas generator. For example, some embodiments may determine whether an exhaust gas of a gas generator has a methane or ethane concentration that is greater than a concentration threshold, such as 1%. In response to a determination that the exhaust gas has a methane or ethane concentration greater than 1%, some embodiments may actuate a valve or otherwise modify the state of a valve to increase the concentration of oxygen molecules in a fluid mixture provided to the gas generator.

In some embodiments, measures of a fluid property may be used to cause changes in the operations of a gas generator or set of fluid control devices used to process fuel for the gas generator. Some embodiments may determine whether a nitrogen oxide measurement provided by a nitrogen oxides sensor indicates satisfaction of a nitrogen oxides concentration threshold. In response to a determination that a nitrogen oxides measurement is greater than the nitrogen oxides concentration threshold, some embodiments may configure a set of operational parameters of gas generator system to reduce an engine temperature or reduce a nitrogen concentration of gas flowing into a gas generator. For example, in response to a determination that a nitrogen oxides concentration is greater than a nitrogen oxides concentration threshold, some embodiments may reduce a relative amount of atmospheric nitrogen in a fluid mixture.

In some embodiments, the target value may be a target fluid property, where determining whether the set of measurements satisfy the set of adjustment criteria may include determining whether a measurement of a fluid property satisfies a set of criteria based on the target fluid property. As described elsewhere in this disclosure, a fluid property may include an energy density, a mass density, a viscosity, a temperature, a pressure, a composition, or the like. For example, some embodiments may determine whether an energy density of a fluid mixture satisfies an energy density threshold. In some embodiments, a determination that the energy density satisfies the energy density threshold may cause a change in an operational parameter of a set of fluid control devices to change a mixture ratio of the fluid mixture. As described elsewhere in this disclosure, changing the operational parameter of a fluid control device may include modifying the load of a compressor, actuating a valve, increasing a pump turbine speed, or the like. For example, some embodiments may actuate a valve to increase a flow rate of a cooled exhaust gas provided by a gas generator relative to a flow rate of hydrocarbon gas, such as hydrocarbon gas provided by a hydrocarbon well. As described elsewhere in this disclosure, by diluting an input gas obtained directly from a hydrocarbon well with exhaust gas, some embodiments may then modify the energy density of an input fluid mixture of a gas generator to satisfy an energy density range of the gas generator.

In some embodiments, determining whether the set of measurements satisfy the set of adjustment criteria may include determining whether a measurement is within a tolerance range of a set of values. For example, a target value may include the value "90%" to indicate that an adaptable intake-adaptable gas generator system is to consume at least 90% of gases produced by a well or stored in a fluid tank. If a determination is made that a measured gas consumption rate is 91%, some embodiments may determine that the set of adjustment criteria is not satisfied. Alternatively, if a determination is made that a measured gas consumption rate is 89%, some embodiments may determine that the set of adjustment criteria is satisfied. If the set of adjustment criteria is satisfied, operations of the process 600 may proceed to operations described by block 655. Otherwise, operations of the process 600 may return to operations described by block 620 or may end. Furthermore, some embodiments may first determine whether a criterion based on a target value is satisfied earlier in the process 600, such as after determining the target value as described for block 610, obtaining the set of electrical measurements as described for block 620, obtaining the set of fluid measurements as described for block 630, or the like. In response to a determination that the criterion based on the target value is satisfied, some embodiments may proceed without modifying one or more operational parameters of an intake-adaptable gas generator system.

In some embodiments, the process 600 may include determining a set of operational parameters based on the target value, as indicated for block 655. As discussed above, some embodiments may normalize a set of measurements, computation results based on measurements, operational parameter(s), target value(s), or the like. Some embodiments may determine the effect that a change in a measurement or parameter may have on another measurement or parameter using a weighting value (sometimes known as a "trim" value or trim weight). By determining the effect that a change in a may have on a variable using weights, some embodiments may represent the relationship between a manipulatable operational parameter and a set of measurements or target values as a linear system, where iterative optimization may be used to determine what operational parameters to change in order to satisfy one or more criteria based on a set of target values.

Some embodiments may use one or more sets of upper-bound thresholds or lower-bound thresholds for one or more of the measurements or parameters. For example, some embodiments may include a compressor load as an operational parameter that may be changed to satisfy a criterion based on a target value, such as a target power generation rate or a target gas consumption rate. The compressor load may have an upper-bound threshold of 500 Watts (W) and a lower-bound threshold of 5 W to indicate that the compressor may not be adjusted to consume more than 500 W or less than 5 W during operations of the intake-adaptable gas generator system. In response to a determination that a measured power consumption is greater than the upper-bound threshold or less than a lower-bound threshold, some embodiments may then change a compressor configuration, as described elsewhere in this disclosure.

Some embodiments may generate a sequence of operational parameters associated with different kinds or operational conditions. For example, some embodiments may generate a sequence of compressor load values or digital valve control values to increase a gas tank storage pressure, which may increase an amount of gas to be sent into a gas generator. For example, after determining a sequence of predicted fluid flow rates for a future 10-hour duration, some embodiments may then perform a set of iterative optimization operations (e.g., a stationary iterative method, Krylov subspace methods, or the like) to determine a corresponding sequence of operational parameters to satisfy a criterion based on a target value. For example, some embodiments may determine a sequence of compressor pumping loads to satisfy a criterion based on a target value such as "100%," which may include a criterion that a gas generator is to consume 100% of gases being produced from a hydrocarbon well, where the sequence of compressor pumping loads may change in correlation with a sequence of predicted fluid flow rates that indicate an increase in the amount of gas over a 5 hour duration. Furthermore, while the above describes iterative optimization operations, machine-learning operations or other operations usable to solve a linear or nonlinear system to satisfy a set of criteria based on a set of target values may be used to configure an intake-adaptable gas generator system.

In some embodiments, the process 600 may include actuating or otherwise modifying the state of a set of fluid control devices based on the set of operational parameters, as indicated by block 660. As described elsewhere in this disclosure, some embodiments may actuate or otherwise modify the state of a fluid control device based on a set of operational parameters in response to changes in a set of measurements. In some embodiments, modifying a fluid control device may include directly setting a digital input of a control system to the parameter. For example, the parameter may comprise the value 1.0 that may then be converted to a digital value such as "100", which may then be sent to a compressor to cause the compressor to operate at a compressor load equal to 100%. Alternatively, or in addition, the parameter may include a dimensionalized value, such as 10 cubic meters per second, where the dimensionalized value may be used to modify a fluid control device.

In some embodiments, modifying the state of a fluid control device may include modifying the configuration of a fluid tank or other fluid control device to satisfy a set of operational parameters determined from one or more predicted values. For example, an operational parameter may include a storage capacity, where the storage capacity is determined to be less than a threshold capacity, where the threshold capacity may be based on a possible or predicted increase in gas being produced by a hydrocarbon well, tank, or another gas source. In response, some embodiments may modify a fluid control device to reduce a fluid tank pressure or decrease a storage pressure load to increase a fluid storage capacity of a fluid tank, or otherwise satisfy a gas storage capacity threshold.

In some embodiments, modifying the fluid control system may include modifying a set of fluid control devices to satisfy an operational mode, such as consuming all of the gas being produced by a hydrocarbon well. For example, a set of fluid control devices may be determined using one or more of the operations described above to store or use all of the gas being produced by a hydrocarbon well. Some embodiments may then perform operations such as increase the amount of gas being stored in a storage chamber, increasing a fluid tank pressure, increasing a compressor load, or the like based on the set of fluid control devices. For example, based on a detected pressure increase or a detected rate of the pressure increase, some embodiments may increase a compressor parameter, such as a compressor speed.

In some embodiments, modifying the fluid control system may include modifying a set of fluid tanks based on a pressure change. For example, modifying the fluid control system may include modifying a gas storage valve or a compressor operational parameter to increase a gas tank pressure to capture an incoming gas peak, where an incoming gas peak may be the result of a natural phenomenon, an accident, or an operational change at a gas well. Alternatively, some embodiments may detect a temperature change and reduce a gas pressure by reducing a gas compressor load. Furthermore, some embodiments may measure a consistency of pressure or temperature measurements and modify a fluid tank parameter based on the consistency. For example, some embodiment may determine a pressure or temperature variance and, in response to the variance satisfying a variance threshold, update the variance. Alternatively, or in addition, some embodiments may actuate a valve or adjust a temperature of a fluid tank or other component to increase an amount of condensate that is recovered from a fluid mixture.

As described elsewhere in this disclosure, a gas supply provided by a hydrocarbon well may be inconsistent and provide less gas than predicted or more gas than predicted. Some embodiments may detect that a fluid flow rate is lower than an expected value. In response, some embodiments may reduce a generator speed or other generator-controlling parameter of a gas generator to reduce hydrocarbon consumption. By reducing a generator-controlling parameter, some embodiments may cool the gas generator and reduce mechanical degradation of the gas generator. Similarly, some embodiments may actuate a valve or change a compressor speed to decrease an energy density of a fluid mixture in response to a determination that a fluid mixture has an energy density measurement that is greater than an energy density threshold. For example, some embodiments may increase a compressor recycle amount (i.e., the amount of fluid that is discharged from the compressor that is then directly fed back into an inlet of the compressor) in response to a detected differential pressure measurement.

Various other operational parameters (e.g., an operational parameter that controls a gas flow rate, a pressure of a section of a gas generator system, or the like) may be modified in response to a set of measurements satisfying a set of criteria. Such measurements may include measurements discharge amounts, suction pressures, or differential pressure measurements of a fluid tank. For example, some embodiments may determine that a specific frequency of a distortion is greater than a distortion threshold and, in response, reduce a load on a gas generator by increasing a flow rate of carbon dioxide from exhaust gas relative to gas from a hydrocarbon well. By increasing the exhaust gas flow rate, the ratio of carbon dioxide to hydrocarbon gas may increase, which may consequently reduce the load on a generator.

In some embodiments, a set of fluid control devices may be configured based on fluid measurements. For example, a pressure sensor of a hydrocarbon well may be monitored to increase a compressor capacity in response to a predicted pressure increase of a fluid tank. Some embodiments may adjust a trim value by performing operations such as normalizing an average pressure, determining a parameter based on a duration of an event, determine a flow rate change based on a tank pressure increase, or the like. Some embodiments may scale an event's effects based on a measured slope or an average value. By determining averages or otherwise permitting previous measurements to modify a trim value impact of a current measurement, some embodiments may reduce or increase the effect that the current measurement has on a parameter of a generator, compressor, valve, or other fluid control device. In addition, some embodiments may actuate a dump valve on a fluid tank, such as a scrubber tank, to inject hydrocarbon gas into the fluid tank from a compressed gas supply from the secondary tank. In some embodiments, the rapid injection of hydrocarbon gas into a fluid tank may reduce the risk of equipment failure from sudden changes in pressure, such as during tank depletion events caused by gas removal.

As described elsewhere in this disclosure, some embodiments may modify the state of a fluid control device based on a measurement of a chemical presence or concentration. Some embodiments may obtain oxygen measurements from an oxygen sensor in a pipe or another conduit that is used to deliver gas or other fluids. In some embodiments, a detected oxygen measurement may cause the actuation of a valve to increase the injection rate of oxygen from an oxygen source into the pipe. Furthermore, some embodiments may determine that an amount of oxygen is greater than a threshold and, in response, stop the flow of a hydrocarbon fluid out of a fluid tank or purge the fluid tank with hydrocarbon gas. Alternatively, or in addition, some embodiments may modify the state of a fluid control device based on a detection of a nitrogen oxide, such as nitrogen dioxide or nitrogen trioxide. For example, some embodiments may determine that a detected nitrogen dioxide measurement is greater than a concentration threshold and, in response, reduce a flow rate of atmospheric air into a fluid mixture that is then provided to a gas generator via an inlet. Alternatively, or in addition, some embodiments may increase a flow rate of an inert gas to a generator inlet relative to the atmospheric nitrogen.

Furthermore, as described elsewhere in this disclosure, some embodiments may detect an electrical measurement, such as a set of harmonic measurements, and adjust the operation of a fluid control device in response to the electrical measurement. For example, some embodiments may obtain a set of electrical measurements of electrical energy generated by a gas generator and determine that the set of electrical measurements satisfies a set of measurement criteria indicating a flagged harmonic distortion or another type of flagged harmonic. In response to a determination that a set of measurements indicates a flagged harmonic, some embodiments may reduce a gas generator speed. In some embodiments, reducing a gas generator speed may include actuating a valve to reduce the amount of a fluid mixture being provided to the gas generator for combustion or increasing an amount of carbon dioxide gas in the input fluid mixture. For example, some embodiments may increase a first flow rate relative to a second flow rate, where the first flow rate is the rate at which exhaust gas is sent into a compressor inlet, and where the second flow rate is the rate at which non-recycled gas sent from a hydrocarbon well is sent to the compressor inlet.

As described elsewhere in this disclosure, some embodiments may apply a plurality of criteria having different associated thresholds and associated with different types of measurements. For example, some embodiments may perform ride-through operations, such that some embodiments may effect no changes in the parameters or states of components of an intake-adaptable gas generator while measurements are within the dead bands of a set of target values, where each respective dead band of a target value may have different ranges or units. In addition, some embodiments may include a set of safety thresholds that are shared between different operational modes. For example, some embodiments may include a first operational mode that causes an intake-adaptable gas generator system to generate power for on-site operations and a second operational mode to maximize electricity generation, where both modes share a criterion to stop operations if a temperature satisfies a safety threshold.

Figure 7:
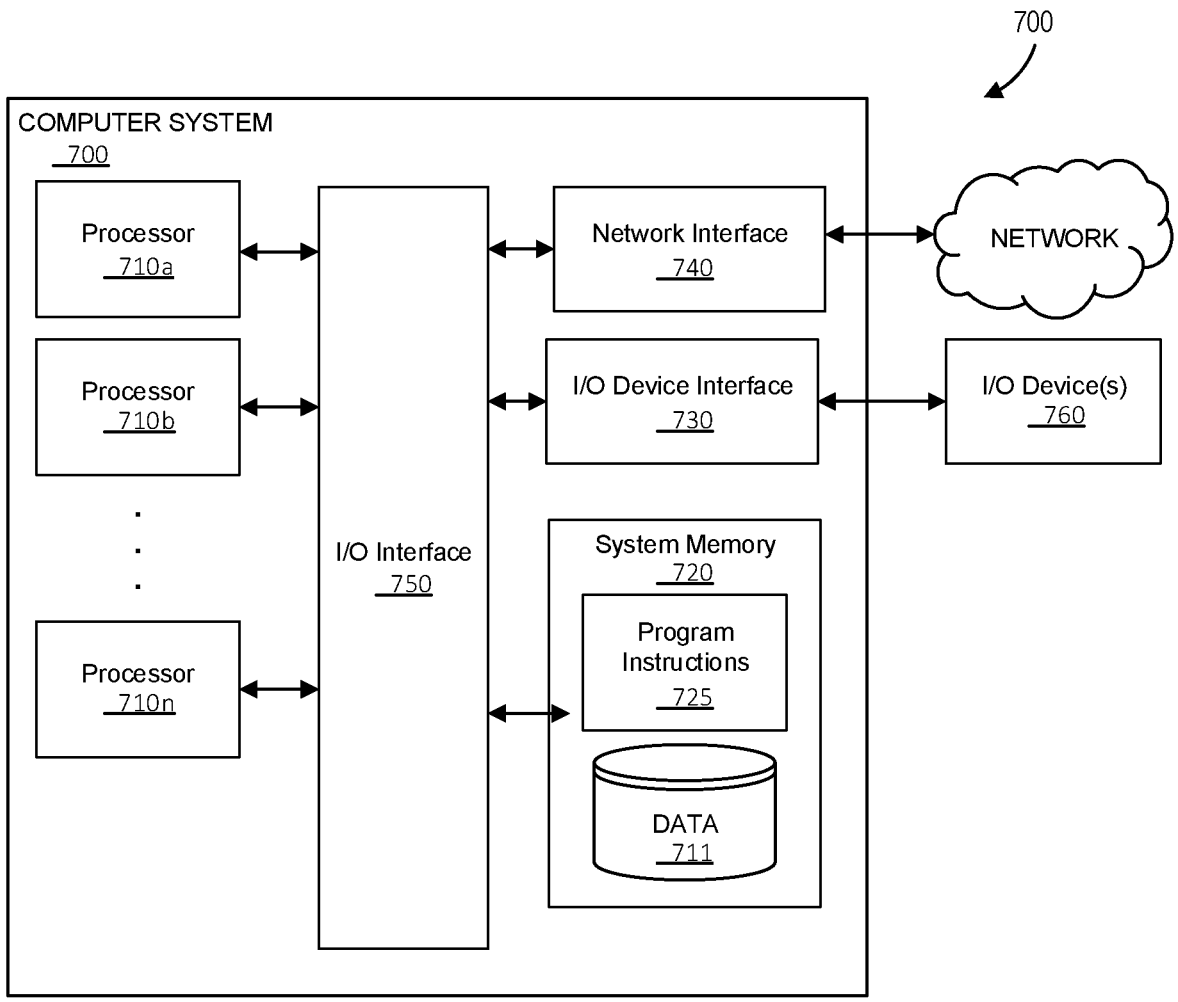
FIG. 7 shows an example of a computing device by which the present techniques may be implemented, in accordance with some embodiments.

FIG. 7 shows an example of a computing device by which the present techniques may be implemented, in accordance with some embodiments. Various portions of systems and methods described herein, may include or be executed on one or more computer systems similar to computer system 700. Further, processes and modules described herein, such as one or more operations described for the process 600, may be executed by one or more processing systems similar to that of computer system 700.

Computer system 700 may include one or more processors (e.g., processors 710*a*-710*n*) coupled to System memory 720, an input/output I/O device interface 730, and a network interface 740 via an input/output (I/O) interface 750. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may include one or more microcontrollers. A processor may receive instructions and data from a memory (e.g., System memory 720). Computer system 700 may be a uni-processor system including one processor (e.g., processor 710a), or a multi-processor system including any number of suitable processors (e.g., 710a-710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 700 may include a plurality of computing devices (e.g., distributed computer systems) to implement various processing functions.

I/O device interface 730 may provide an interface for connection of one or more I/O devices 760 to computer system 700. I/O devices may include devices that receive input (e.g., from a user) or output information (e.g., to a user). I/O devices 760 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computer system 700 through a wired or wireless connection. I/O devices 760 may be connected to computer system 700 from a remote location. I/O devices 760 located on remote computer system, for example, may be connected to computer system 700 via a network and network interface 740.

Network interface 740 may include a network adapter that provides for connection of computer system 700 to a network. Network interface may 740 may facilitate data exchange between computer system 700 and other devices connected to the network. Network interface 740 may support wired or wireless communication. The network may include an electronic communication network, such as the Internet, a local area network (LAN), a wide area network (WAN), a cellular communications network, or the like.

System memory 720 may be configured to store program instructions 724 or data 710. Program instructions 724 may be executable by a processor (e.g., one or more of processors 710a-710n) to implement one or more embodiments of the present techniques. Program instructions 724 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 720 may include a tangible program carrier having program instructions stored thereon. A tangible program carrier may include a non-transitory, computer-readable storage medium. A non-transitory, computer-readable storage medium may include a machine readable storage device, a machine readable storage substrate, a memory device, or any combination thereof. Non-transitory, computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 720 may include a non-transitory, computer-readable storage medium that may have program instructions stored thereon that are executable by a computer processor (e.g., one or more of processors 710a-710n) to cause the subject matter and the functional operations described herein. A memory (e.g., System memory 720) may include a single memory device and/or a plurality of memory devices (e.g., distributed memory devices). Instructions or other program code to provide the functionality described herein may be stored on a tangible, non-transitory, computer-readable media. In some cases, the entire set of instructions may be stored concurrently on the media, or in some cases, different parts of the instructions may be stored on the same media at different times.

I/O interface 750 may be configured to coordinate I/O traffic between processors 710a-710n, System memory 720, network interface 740, I/O devices 760, and/or other peripheral devices. I/O interface 750 may perform protocol, timing, or other data transformations to convert data signals from one component (e.g., System memory 720) into a format suitable for use by another component (e.g., processors 710a-710n). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 700 or multiple computer systems 700 configured to host different portions or instances of embodiments. Multiple computer systems 700 may provide for parallel or sequential processing/execution of one or more portions of the techniques described herein.

Those skilled in the art will appreciate that computer system 700 is merely illustrative and is not intended to limit the scope of the techniques described herein. Computer system 700 may include any combination of devices or software that may perform or otherwise provide for the performance of the techniques described herein. For example, computer system 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a GPS device, or the like. Computer system 700 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The word "set" when used as a noun include a single item or a plurality of items, such that the phrase "set of items" may refer to either a single item or multiple items. The words "include", "including", and "includes" and the like mean including, but not limited to. As used throughout this application, the singular forms "a," "an," and "the" include plural referents unless the content explicitly indicates otherwise. Thus, for example, reference to "an element" or "an element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

Additional detail regarding some embodiments may be described in the following:

1. A system comprising: a gas generator to generate electrical energy using a fluid mixture obtained via a generator inlet of the gas generator, wherein a portion of the fluid mixture comprises gas provided by a hydrocarbon well; a compressor, wherein a compressor inlet of the compressor is attached to a generator outlet of the gas generator by a first set of conduits, and wherein exhaust fluid of the gas generator is provided to the compressor via the first set of conduits, and wherein the first set of conduits comprises a conduit attached to the hydrocarbon well; a second set of conduits connecting a compressor outlet of the compressor to the generator inlet; a sensor attached to the second set of conduits, wherein the sensor measures fluid properties of fluids flowing through a portion of the second set of conduits; a non-transitory, machine-readable medium of storing instructions that, when executed by a computer system, effectuate operations comprising: obtaining, with the computer system, a target fluid property of the fluid mixture entering the generator inlet; obtaining, with the computer system, a fluid measurement of the fluid mixture using the sensor; determining, with the computer system, whether the fluid measurement satisfies a criterion based on the target fluid property; and in response to a determination that the target fluid property satisfies the criterion, modifying, with the computer system, an operational parameter of a set of fluid control devices to increase a first flow rate relative to a second flow rate, wherein the first flow rate is a measurement of the flow of the exhaust fluid through the second set of conduits, and wherein the second flow rate is a measurement of the flow of the gas provided by the hydrocarbon well through the first set of conduits.

2. The system of embodiment 1, wherein the set of fluid control devices comprises at least one of the compressor or a valve attached to the first set of conduits.

3. The system of any of embodiments 1 to 2, further comprising: a heat exchanger, wherein the heat exchanger is connected to the gas generator by the first set of conduits, and wherein the exhaust fluid of the gas generator is sent to the heat exchanger via the first set of conduits, and wherein the heat exchanger comprises a third set of conduits, the operations further comprising: determining whether a temperature of the exhaust fluid flowing through an outlet of the heat exchanger satisfies a threshold; and in response to a determination that the temperature of the exhaust fluid satisfies the threshold, increasing a water flow through the third set of conduits.

4. The system of any of embodiments 1 to 3, the operations further comprising: obtaining a harmonics measurement of the gas generator; determining whether the harmonics measurement satisfies a threshold; and in response to a determination that the harmonics measurement satisfies the threshold, actuating a valve attached to the generator inlet to reduce a gas flow through the generator inlet.

5. The system of any of embodiments 1 to 4, wherein the generator inlet is a first generator inlet, and wherein the gas generator comprises a second generator inlet to receive fluid from atmospheric air, the system further comprising: a first conduit connected to the second generator inlet; a valve attached to the first conduit, wherein the valve is attached a second conduit; a gas source, wherein the gas source is attached to the second conduit, the operations further comprising: determining whether the fluid measurement obtained by the sensor satisfies a threshold; and in response to a determination that the fluid measurement obtained by the sensor satisfies the threshold, actuate the valve to increase a flow of an inert gas from the gas source to the gas generator.

6. The system of any of embodiments 1 to 5, further comprising: a first fluid tank, wherein fluid from the compressor is pumped to the first fluid tank; a first conduit of the second set of conduits, wherein the first conduit is attached to the first fluid tank at a first attachment point of the first fluid tank; and a second fluid tank connected to the first fluid tank via the first conduit, wherein: the first conduit is attached to the second fluid tank via a second attachment point of the second fluid tank; the second attachment point is greater in height relative to the first attachment point; and the second fluid tank is connected to the generator inlet via a third conduit of the second set of conduits.

7. The system of embodiment 6, wherein the sensor is a first sensor, the system further comprising a second sensor attached to the first fluid tank, the operations further comprising: obtaining a measurement of a height of a liquid in the first fluid tank based on the second sensor; determining whether the measurement of the height of the liquid satisfies a threshold; and in response to a determination that the measurement of the height satisfies the threshold, actuating a valve attached to a fluid outlet of the second fluid tank, wherein the fluid outlet is lower in height than the first attachment point.

8. The system of any of embodiments 1 to 7, wherein the sensor is a first sensor, the operations further comprising: obtaining a nitrogen oxide measurement from a second sensor, wherein the second sensor measures the exhaust fluid; determining whether the nitrogen oxide measurement satisfies an adjustment criterion; and in response to a determination that the nitrogen oxide measurement satisfies the adjustment criterion, actuating a valve to reduce a flow rate of atmospheric air that is flowing into the gas generator.

9. The system of any of embodiments 1 to 8, the system further comprising a temperature sensor to measure the exhaust fluid, the operations further comprising: determining whether a temperature measurement of the temperature sensor satisfies a threshold; and in response to a determination that the temperature measurement satisfies the threshold, actuating a valve to reduce the flow rate of the fluid mixture flowing into the gas generator.

10. The system of any of embodiments 1 to 9, the operations further comprising: determining whether an energy density of a recycled fluid mixture flowing from the compressor satisfies a threshold; and in response to a determination that the energy density of the recycled fluid mixture satisfies the threshold, actuating a valve of a second conduit of the gas generator to increase an amount of exhaust fluid flowing into the generator inlet.

11. The system of any of embodiments 1 to 10, further comprising a gas pressurizer, wherein the exhaust fluid generated by the gas generator is sent to the gas pressurizer via a third set of conduits, the operations further comprising: increasing a pressure of the exhaust fluid in the gas pressurizer to generate liquid carbon dioxide; and reducing a pressure of the liquid carbon dioxide in the gas pressurizer to generate solid carbon dioxide.

12. The system of embodiment 11, the operations further comprising: determining a sulfide content of the exhaust fluid; determining whether the sulfide content of the exhaust fluid satisfies a threshold; and in response to a determination that the sulfide content of the exhaust fluid satisfies the threshold, reducing an amount of exhaust fluid provided to the gas pressurizer.

13. The system of any of embodiments 1 to 12, the system further comprising a valve, wherein: the valve controls a flow rate of the exhaust fluid to the atmosphere; and the operations further comprise: determining whether a pressure difference between a pressure of a fluid flowing through the generator outlet satisfies a threshold; and in response to a determination that the pressure difference satisfies the threshold, actuating the valve to send the exhaust fluid flowing through the first set of conduits to the atmosphere.

14. The system of any of embodiments 1 to 13, wherein the sensor is a first sensor, the system further comprising: an evaporator that is connected to the generator outlet via a subset of conduits of the first set of conduits; an exhaust bypass valve, wherein the exhaust bypass valve controls an amount of water send to the evaporator, the operations further comprising: determining that a fluid property measured by a second sensor of the evaporator satisfies a threshold; and in response to a determination that the fluid property satisfies the threshold, increasing a water flow through a third set of conduits by actuating the exhaust bypass valve, wherein the water flowing through the third set of conduits is at a lesser temperature than the exhaust fluid flowing into the evaporator.

15. The system of embodiment 14, further comprising: a second set of tanks, wherein the second set of tanks receives fluid from the evaporator; a filter to collect solids of the fluid in the second set of tanks; a third set of tanks, wherein the third set of tanks receive filtered fluid from the second set of tanks; and a third conduit connecting the third set of tanks to the evaporator.

16. The system of any of embodiments 1 to 15, further comprising a gas source, wherein: the gas source is connected to the generator inlet via a valve; and the operations further comprise: determining whether a hydrocarbon concentration measurement of fluid flowing through the generator outlet satisfies a threshold; and in response to a determination that the hydrocarbon concentration measurement satisfies the threshold, actuating the valve to increase an amount of oxygen flowing from the gas source.

17. The system of any of embodiments 1 to 16, the operations further comprising: obtaining a target power output; obtaining a set of electrical measurements for a set of components electrically connected to the gas generator, wherein the set of electrical measurements comprises a current measurement or a voltage measurement; wherein obtaining the fluid measurement comprises obtaining a sequence of pressure measurements using the sensor; determining a set of predicted fluid flow rates based on the sequence of pressure measurements; determining a sequence of predicted power outputs based on the set of predicted fluid flow rates; determining whether a predicted power output of the sequence of predicted power outputs satisfies a criterion of the target power output; and actuating a valve attached to a fluid tank in response to a determination that the predicted power output does not satisfy the criterion based on the target power output, wherein the fluid tank is connected to the generator inlet.

18. The system of any of embodiments 1 to 17, wherein the operational parameter is a first parameter, and wherein the sensor is a first sensor, the operations further comprising: obtaining a target gas consumption amount; wherein obtaining the fluid measurement comprises obtaining a sequence of pressure measurements using a second sensor attached to the hydrocarbon well; determining a set of predicted fluid flow rates based on the sequence of pressure measurements; determining a second parameter based on the set of predicted fluid flow rates and the target gas consumption amount; and configuring the set of fluid control devices based on the second parameter.

19. The system of embodiment 18, the operations further comprising: determining that the set of predicted fluid flow rates indicate an increase in the amount of gas to be received from the hydrocarbon well; increasing an allowable storage pressure of a fluid tank connected to the gas generator by a third set of conduits based on the increase in the amount of gas to be received from the hydrocarbon well.

20. A method comprising: obtaining, with a computer system, a target fluid property of a fluid mixture entering a generator inlet of a gas generator, wherein: the gas generator generates electrical energy using the fluid mixture obtained via the generator inlet, a portion of the fluid mixture comprises gas provided by a hydrocarbon well, a compressor inlet of a compressor is attached to a generator outlet of the gas generator by a first set of conduits, exhaust fluid of the gas generator is provided to the compressor via the first set of conduits; a second set of conduits connects a compressor outlet of the compressor to the generator inlet; and a sensor measures fluid properties of fluids flowing through a portion of the second set of conduits; obtaining, with the computer system, a fluid measurement of the fluid mixture using the sensor; determining, with the computer system, whether the fluid measurement satisfies a criterion based on the target fluid property; and in response to a determination that the target fluid property satisfies the criterion, modifying, with the computer system, an operational parameter of a set of fluid control devices to increase a first flow rate relative to a second flow rate, wherein the first flow rate is a measurement of the flow of the exhaust fluid through the first set of conduits, and wherein the second flow rate is a measurement of the flow of the gas provided by the hydrocarbon well through the first set of conduits.

21. The method of embodiment 20, wherein the set of fluid control devices comprises at least one of the compressor or a valve attached to the first set of conduits.

22. The method of any of embodiments 20 to 21, the method further comprising: determining whether an energy density of a recycled fluid mixture flowing from the compressor satisfies a threshold; and in response to a determination that the energy density of the recycled fluid mixture satisfies the threshold, actuating a valve of a second conduit of the gas generator to increase an amount of exhaust fluid flowing into the generator inlet.

23. The method of any of embodiments 20 to 22, further comprising: determining whether a temperature of the exhaust fluid flowing through an outlet of a heat exchanger satisfies a threshold, wherein the heat exchanger is connected to the gas generator by the first set of conduits, and wherein the exhaust fluid of the gas generator is sent to the heat exchanger via the first set of conduits, and wherein the heat exchanger comprises a third set of conduits; and in response to a determination that the temperature of the exhaust fluid satisfies the threshold, increasing a water flow through the third set of conduits.

24. The method of any of embodiments 20 to 23, further comprising: obtaining a harmonics measurement of the gas generator; determining whether the harmonics measurement satisfies a threshold; and in response to a determination that the harmonics measurement satisfies the threshold, actuating a valve attached to the generator inlet to reduce a gas flow through the generator inlet.

25. The method of any of embodiments 20 to 24, wherein the generator inlet is a first generator inlet, and wherein the gas generator comprises a second generator inlet to receive fluid from atmospheric air, the method further comprising: determining whether the fluid measurement obtained by the sensor satisfies a threshold; and in response to a determination that the fluid measurement obtained by the sensor satisfies the threshold, actuate a valve to increase a flow of an inert gas from a gas source to a gas generator, wherein the valve is attached to a first conduit and a second conduit, wherein the first conduit is connected to the second generator inlet, and wherein the gas source is attached to the second conduit.

26. The method of any of embodiments 20 to 25, wherein the sensor is a first sensor, the method further comprising: obtaining a measurement of a height of a liquid in a first fluid tank based on a second sensor, wherein the second sensor is attached to the first fluid tank, and wherein fluid from the compressor is pumped to the first fluid tank; determining whether a measurement of the height of the liquid satisfies a threshold; and in response to a determination that the measurement of the height satisfies the threshold, actuating a valve attached to a fluid outlet of a second fluid tank, wherein: the fluid outlet is lower in height than a first attachment point; a first conduit of the second set of conduits is attached to the first fluid tank at the first attachment point of the first fluid tank; the second fluid tank is connected to the first fluid tank via the first conduit; the first conduit is attached to the second fluid tank via a second attachment point of the second fluid tank; the second attachment point is greater in height relative to the first attachment point; and the second fluid tank is connected to the generator inlet via a third conduit of the second set of conduits.

27. The method of any of embodiments 20 to 26, wherein the sensor is a first sensor, the method further comprising: obtaining a nitrogen oxide measurement from a second sensor, wherein the second sensor measures the exhaust fluid; determining whether the nitrogen oxide measurement satisfies an adjustment criterion; and in response to a determination that the nitrogen oxide measurement satisfies the adjustment criterion, actuating a valve to reduce a flow rate of atmospheric air that is flowing into the gas generator.

28. The method of any of embodiments 20 to 27, further comprising: determining whether a temperature measurement of a temperature sensor satisfies a threshold, wherein the temperature sensor measures the exhaust fluid; and in response to a determination that the temperature measurement satisfies the threshold, actuating a valve to reduce the flow rate of the fluid mixture flowing into the gas generator.

29. The method of any of embodiments 20 to 28, wherein the exhaust fluid generated by the gas generator is sent to a gas pressurizer via a third set of conduits, the method further comprising: increasing a pressure of the exhaust fluid in the gas pressurizer to generate liquid carbon dioxide; and reducing a pressure of the liquid carbon dioxide in the gas pressurizer to generate solid carbon dioxide.

30. The method of any of embodiments 29, further comprising: determining a sulfide content of the exhaust fluid; determining whether the sulfide content of the exhaust fluid satisfies a threshold; and in response to a determination that the sulfide content of the exhaust fluid satisfies the threshold, reducing an amount of exhaust fluid provided to the gas pressurizer.

31. The method of any of embodiments 20 to 30, further comprising: determining whether a pressure difference between a pressure of a fluid flowing through the generator outlet satisfies a threshold; and in response to a determination that the pressure difference satisfies the threshold, actuating a valve to send the exhaust fluid flowing through the first set of conduits to the atmosphere, wherein the valve controls a flow rate of the exhaust fluid to the atmosphere.

32. The method of any of embodiments 20 to 31, wherein the sensor is a first sensor, the method further comprising: determining that a fluid property measured by a second sensor of an evaporator satisfies a threshold, wherein the evaporator is connected to the generator outlet via a subset of conduits of the first set of conduits; and in response to a determination that the fluid property satisfies the threshold, increasing a water flow through a third set of conduits by actuating an exhaust bypass valve, wherein the water flowing through the third set of conduits is at a lesser temperature than the exhaust fluid flowing into the evaporator, wherein the exhaust bypass valve controls an amount of water send to the evaporator.

33. The method of any of embodiments 20 to 32, further comprising: determining whether a hydrocarbon concentration measurement of fluid flowing through the generator outlet satisfies a threshold; and in response to a determination that the hydrocarbon concentration measurement satisfies the threshold, actuating a valve to increase an amount of oxygen flowing from a gas source, wherein the gas source is connected to the generator inlet via the valve.

34. The method of any of embodiments 20 to 33, further comprising: obtaining a target power output; obtaining a set of electrical measurements for a set of components electrically connected to the gas generator, wherein the set of electrical measurements comprises a current measurement or a voltage measurement; wherein obtaining the fluid measurement comprises obtaining a sequence of pressure measurements using the sensor; determining a set of predicted fluid flow rates based on the sequence of pressure measurements; determining a sequence of predicted power outputs based on the set of predicted fluid flow rates; determining whether a predicted power output of the sequence of predicted power outputs satisfies a criterion of the target power output; and actuating a valve attached to a fluid tank in response to a determination that the predicted power output does not satisfy the criterion based on the target power output, wherein the fluid tank is connected to the generator inlet.

35. The method of any of embodiments 20 to 34, wherein the operational parameter is a first parameter, and wherein the sensor is a first sensor, the method further comprising: obtaining a target gas consumption amount; wherein obtaining the fluid measurement comprises obtaining a sequence of pressure measurements using a second sensor attached to the hydrocarbon well; determining a set of predicted fluid flow rates based on the sequence of pressure measurements; determining a second parameter based on the set of predicted fluid flow rates and the target gas consumption amount; and configuring the set of fluid control devices based on the second parameter.

36. The method of any of embodiments 35, further comprising: determining that the set of predicted fluid flow rates indicate an increase in the amount of gas to be received from the hydrocarbon well; increasing an allowable storage pressure of a fluid tank connected to the gas generator by a third set of conduits based on the increase in the amount of gas to be received from the hydrocarbon well.

37. An apparatus comprising: a gas generator to generate electrical energy using a fluid mixture obtained via a generator inlet of the gas generator, wherein a portion of the fluid mixture comprises gas provided by a hydrocarbon well; a compressor, wherein a compressor inlet of the compressor is attached to a generator outlet of the gas generator by a first set of conduits, and wherein exhaust fluid of the gas generator is provided to the compressor via the first set of conduits, and wherein the first set of conduits comprises a conduit attached to the hydrocarbon well; a second set of conduits connecting a compressor outlet of the compressor to the generator inlet; a sensor attached to the second set of conduits, wherein the sensor measures fluid properties of fluids flowing through a portion of the second set of conduits.

38. The apparatus of any of embodiments 37, wherein the set of fluid control devices comprises at least one of the compressor or a valve attached to the first set of conduits.

39. The apparatus of any of embodiments 37 to 38, further comprising: a heat exchanger, wherein the heat exchanger is connected to the gas generator by the first set of conduits, and wherein the exhaust fluid of the gas generator is sent to the heat exchanger via the first set of conduits, and wherein the heat exchanger comprises a third set of conduits.

40. The apparatus of any of embodiments 37 to 39, further comprising a valve attached to the generator inlet.

41. The apparatus of any of embodiments 37 to 40, wherein the generator inlet is a first generator inlet, and wherein the gas generator comprises a second generator inlet to receive fluid from atmospheric air, the apparatus further comprising: a first conduit connected to the second generator inlet; a valve attached to the first conduit, wherein the valve is attached a second conduit; a gas source, wherein the gas source is attached to the second conduit.

42. The apparatus of any of embodiments 37 to 41, further comprising: a first fluid tank, wherein fluid from the compressor is pumped to the first fluid tank; a first conduit of the second set of conduits, wherein the first conduit is attached to the first fluid tank at a first attachment point of the first fluid tank; and a second fluid tank connected to the first fluid tank via the first conduit, wherein: the first conduit is attached to the second fluid tank via a second attachment point of the second fluid tank; the second attachment point is greater in height relative to the first attachment point; and the second fluid tank is connected to the generator inlet via a third conduit of the second set of conduits.

43. The apparatus of any of embodiments 42, wherein the sensor is a first sensor, the apparatus further comprising: a second sensor attached to the first fluid tank; and a valve attached to a fluid outlet of the second fluid tank, wherein the fluid outlet is lower in height than the first attachment point.

44. The apparatus of any of embodiments 37 to 43, wherein the sensor is a first sensor, the apparatus further comprising:

a nitrogen oxide sensor to measure the exhaust fluid; and a valve to reduce a flow rate of atmospheric air that is flowing into the gas generator.

45. The apparatus of any of embodiments 37 to 44, the apparatus further comprising: a temperature sensor to measure the exhaust fluid; and a valve to reduce the flow rate of the fluid mixture flowing into the gas generator.

46. The apparatus of any of embodiments 37 to 45, further comprising a valve of a second conduit of the gas generator controlling an amount of exhaust fluid flowing into the generator inlet.

47. The apparatus of any of embodiments 37 to 46, further comprising: a gas pressurizer, wherein the exhaust fluid generated by the gas generator is sent to the gas pressurizer via a third set of conduits.

48. The apparatus of any of embodiments 47, further comprising a sulfide content sensor to measure the exhaust fluid.

49. The apparatus of any of embodiments 37 to 48, further comprising a valve that controls a flow rate of the exhaust fluid to the atmosphere.

50. The apparatus of any of embodiments 37 to 49, wherein the sensor is a first sensor, the apparatus further comprising: an evaporator that is connected to the generator outlet via a subset of conduits of the first set of conduits; an exhaust bypass valve, wherein the exhaust bypass valve controls an amount of water send to the evaporator; a third set of conduits attached to the exhaust bypass valve, wherein water flowing through the third set of conduits is at a lesser temperature than the exhaust fluid flowing into the evaporator.

51. The apparatus of any of embodiments 50, further comprising: a second set of tanks, wherein the second set of tanks receives fluid from the evaporator; a filter to collect solids of the fluid in the second set of tanks; a third set of tanks, wherein the third set of tanks receive filtered fluid from the second set of tanks; and a third conduit connecting the third set of tanks to the evaporator.

52. The apparatus of any of embodiments 37 to 51, further comprising a gas source storing oxygen, wherein the gas source is connected to the generator inlet via a valve.

53. The apparatus of any of embodiments 37 to 52, further comprising a valve attached to a fluid tank, wherein the fluid tank is connected to the generator inlet.

54. The apparatus of any of embodiments 53, further comprising a fluid tank connected to the gas generator by a third set of conduits.

55. The system of any of embodiments 1 to 19, the operations further comprising: receiving a wireless signal via a network interface; and determining the target value based on the wireless signal.

56. The system of any of embodiments 1 to 19, the operations further comprising filtering fluid from hydrocarbon well to obtain solid matter, wherein the solid matter comprises at least one of transition metals or alkali metals.

57. The system of any of embodiments 1 to 19, the operations further comprising converting at least a portion of the exhaust gas into solid carbon dioxide.

What is claimed is:

1. A system comprising:
a gas generator to generate electrical energy using a fluid mixture obtained via a generator inlet of the gas generator, wherein a portion of the fluid mixture comprises gas provided by a hydrocarbon well;
a compressor, wherein a compressor inlet of the compressor is attached to a generator outlet of the gas generator by a first set of conduits, and wherein exhaust fluid of the gas generator is provided to the compressor via the first set of conduits, and wherein the first set of conduits comprises a conduit attached to the hydrocarbon well;
a second set of conduits connecting a compressor outlet of the compressor to the generator inlet;
a sensor in communication with the second set of conduits, wherein the sensor measures fluid properties of fluids flowing through a portion of the second set of conduits;
a non-transitory, machine-readable medium of storing instructions that, when executed by a computer system, effectuate operations comprising:
obtaining, with the computer system, a target fluid property of the fluid mixture entering the generator inlet;
obtaining, with the computer system, a fluid measurement of the fluid mixture using the sensor;
determining, with the computer system, whether the fluid measurement satisfies a criterion based on the target fluid property; and
in response to a determination that the target fluid property satisfies the criterion, modifying, with the computer system, an operational parameter of a set of fluid control devices to increase a first flow rate relative to a second flow rate, wherein the first flow rate is a measurement of the flow of the exhaust fluid through the second set of conduits, and wherein the second flow rate is a measurement of the flow of the gas provided by the hydrocarbon well through the first set of conduits.

2. The system of claim 1, wherein the set of fluid control devices comprises at least one of the compressor or a valve attached to the first set of conduits.

3. The system of claim 1, further comprising:
a heat exchanger, wherein the heat exchanger is connected to the gas generator by the first set of conduits, and wherein the exhaust fluid of the gas generator is sent to the heat exchanger via the first set of conduits, and wherein the heat exchanger comprises a third set of conduits, the operations further comprising:
determining whether a temperature of the exhaust fluid flowing through an outlet of the heat exchanger satisfies a threshold; and
in response to a determination that the temperature of the exhaust fluid satisfies the threshold, increasing a water flow through the third set of conduits.

4. The system of claim 1, the operations further comprising:
obtaining a harmonics measurement of the gas generator;
determining whether the harmonics measurement satisfies a threshold; and
in response to a determination that the harmonics measurement satisfies the threshold, actuating a valve attached to the generator inlet to reduce a gas flow through the generator inlet.

5. The system of claim 1, wherein the generator inlet is a first generator inlet, and wherein the gas generator comprises a second generator inlet to receive fluid from atmospheric air, the system further comprising:
a first conduit connected to the second generator inlet;
a valve attached to the first conduit, wherein the valve is attached to a second conduit;
a gas source, wherein the gas source is attached to the second conduit, the operations further comprising:
determining whether the fluid measurement obtained by the sensor satisfies a threshold; and
in response to a determination that the fluid measurement obtained by the sensor satisfies the threshold, actuate the valve to increase a flow of an inert gas from the gas source to the gas generator.

6. The system of claim 1, further comprising:
a first fluid tank, wherein fluid from the compressor is pumped to the first fluid tank;
a first conduit of the second set of conduits, wherein the first conduit is attached to the first fluid tank at a first attachment point of the first fluid tank; and
a second fluid tank connected to the first fluid tank via the first conduit, wherein:
the first conduit is attached to the second fluid tank via a second attachment point of the second fluid tank;
the second attachment point is greater in height relative to the first attachment point; and
the second fluid tank is connected to the generator inlet via a third conduit of the second set of conduits.

7. The system of claim 6, wherein the sensor is a first sensor, the system further comprising a second sensor in communication with the first fluid tank, the operations further comprising:
obtaining a measurement of a height of a liquid in the first fluid tank based on the second sensor;
determining whether the measurement of the height of the liquid satisfies a threshold; and
in response to a determination that the measurement of the height satisfies the threshold, actuating a valve attached to a fluid outlet of the second fluid tank, wherein the fluid outlet is lower in height than the first attachment point.

8. The system of claim 1, wherein the sensor is a first sensor, the operations further comprising:
obtaining a nitrogen oxide measurement from a second sensor, wherein the second sensor measures the exhaust fluid;
determining whether the nitrogen oxide measurement satisfies an adjustment criterion; and
in response to a determination that the nitrogen oxide measurement satisfies the adjustment criterion, actuating a valve to reduce a flow rate of atmospheric air that is flowing into the gas generator.

9. The system of claim 1, the system further comprising a temperature sensor to measure the exhaust fluid, the operations further comprising:
determining whether a temperature measurement of the temperature sensor satisfies a threshold; and
in response to a determination that the temperature measurement satisfies the threshold, actuating a valve to reduce the flow rate of the fluid mixture flowing into the gas generator.

10. The system of claim 1, the operations further comprising:
determining whether an energy density of a recycled fluid mixture flowing from the compressor satisfies a threshold; and
in response to a determination that the energy density of the recycled fluid mixture satisfies the threshold, actuating a valve of a second conduit of the gas generator to increase an amount of exhaust fluid flowing into the generator inlet.

11. The system of claim 1, further comprising a gas pressurizer, wherein the exhaust fluid generated by the gas generator is sent to the gas pressurizer via a third set of conduits, the operations further comprising:
increasing a pressure of the exhaust fluid in the gas pressurizer to generate liquid carbon dioxide; and
reducing a pressure of the liquid carbon dioxide in the gas pressurizer to generate solid carbon dioxide.

12. The system of claim 11, the operations further comprising:
determining a sulfide content of the exhaust fluid;
determining whether the sulfide content of the exhaust fluid satisfies a threshold; and
in response to a determination that the sulfide content of the exhaust fluid satisfies the threshold, reducing an amount of exhaust fluid provided to the gas pressurizer.

13. The system of claim 1, the system further comprising a valve, wherein:
the valve controls a flow rate of the exhaust fluid to the atmosphere; and
the operations further comprise:
determining whether a pressure difference between a pressure of a fluid flowing through the generator outlet satisfies a threshold; and
in response to a determination that the pressure difference satisfies the threshold, actuating the valve to send the exhaust fluid flowing through the first set of conduits to the atmosphere.

14. The system of claim 1, wherein the sensor is a first sensor, the system further comprising:
an evaporator that is connected to the generator outlet via a subset of conduits of the first set of conduits;
an exhaust bypass valve, wherein the exhaust bypass valve controls an amount of water sent to the evaporator, the operations further comprising:
determining that a fluid property measured by a second sensor of the evaporator satisfies a threshold; and
in response to a determination that the fluid property satisfies the threshold, increasing a water flow through a third set of conduits by actuating the exhaust bypass valve, wherein the water flowing through the third set of conduits is at a lesser temperature than the exhaust fluid flowing into the evaporator.

15. The system of claim 14, further comprising:
a second set of tanks, wherein the second set of tanks receives fluid from the evaporator;
a filter to collect solids of the fluid in the second set of tanks;
a third set of tanks, wherein the third set of tanks receive filtered fluid from the second set of tanks; and
a third conduit connecting the third set of tanks to the evaporator.

16. The system of claim 1, further comprising a gas source, wherein:
the gas source is connected to the generator inlet via a valve; and
the operations further comprise:
determining whether a hydrocarbon concentration measurement of fluid flowing through the generator outlet satisfies a threshold; and
in response to a determination that the hydrocarbon concentration measurement satisfies the threshold, actuating the valve to increase an amount of oxygen flowing from the gas source.

17. The system of claim 1, the operations further comprising:
obtaining a target power output;
obtaining a set of electrical measurements for a set of components electrically connected to the gas generator, wherein the set of electrical measurements comprises a current measurement or a voltage measurement;
wherein obtaining the fluid measurement comprises obtaining a sequence of pressure measurements using the sensor;

determining a set of predicted fluid flow rates based on the sequence of pressure measurements;

determining a sequence of predicted power outputs based on the set of predicted fluid flow rates;

determining whether a predicted power output of the sequence of predicted power outputs satisfies a criterion of the target power output; and actuating a valve attached to a fluid tank in response to a determination that the predicted power output does not satisfy the criterion based on the target power output, wherein the fluid tank is connected to the generator inlet.

18. The system of claim 1, wherein the operational parameter is a first parameter, and wherein the sensor is a first sensor, the operations further comprising:

obtaining a target gas consumption amount;

wherein obtaining the fluid measurement comprises obtaining a sequence of pressure measurements using a second sensor in communication with the hydrocarbon well;

determining a set of predicted fluid flow rates based on the sequence of pressure measurements;

determining a second parameter based on the set of predicted fluid flow rates and the target gas consumption amount; and configuring the set of fluid control devices based on the second parameter.

19. The system of claim 18, the operations further comprising:

determining that the set of predicted fluid flow rates indicate an increase in the amount of gas to be received from the hydrocarbon well;

increasing an allowable storage pressure of a fluid tank connected to the gas generator by a third set of conduits based on the increase in the amount of gas to be received from the hydrocarbon well.

20. A method comprising:

obtaining, with a computer system, a target fluid property of a fluid mixture entering a generator inlet of a gas generator, wherein:

the gas generator generates electrical energy using the fluid mixture obtained via the generator inlet, a portion of the fluid mixture comprises gas provided by a hydrocarbon well, a compressor inlet of a compressor is attached to a generator outlet of the gas generator by a first set of conduits, exhaust fluid of the gas generator is provided to the compressor via the first set of conduits;

a second set of conduits connects a compressor outlet of the compressor to the generator inlet; and a sensor measures fluid properties of fluids flowing through a portion of the second set of conduits;

obtaining, with the computer system, a fluid measurement of the fluid mixture using the sensor;

determining, with the computer system, whether the fluid measurement satisfies a criterion based on the target fluid property; and in response to a determination that the target fluid property satisfies the criterion, modifying, with the computer system, an operational parameter of a set of fluid control devices to increase a first flow rate relative to a second flow rate, wherein the first flow rate is a measurement of the flow of the exhaust fluid through the first set of conduits, and wherein the second flow rate is a measurement of the flow of the gas provided by the hydrocarbon well through the first set of conduits.

* * * * *